US009118621B2

(12) United States Patent
Mizunashi

(10) Patent No.: US 9,118,621 B2
(45) Date of Patent: Aug. 25, 2015

(54) NETWORK CONTROLLER, METHOD, AND MEDIUM

(71) Applicant: Ryosuke Mizunashi, Kanagawa (JP)

(72) Inventor: Ryosuke Mizunashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 239 days.

(21) Appl. No.: 13/726,907

(22) Filed: Dec. 26, 2012

(65) Prior Publication Data

US 2013/0179584 A1   Jul. 11, 2013

(30) Foreign Application Priority Data

Jan. 10, 2012 (JP) ................. 2012-002216

(51) Int. Cl.
*H04L 29/06* (2006.01)
*G06F 17/00* (2006.01)
*H04L 29/08* (2006.01)
*H04L 29/12* (2006.01)

(52) U.S. Cl.
CPC ............... *H04L 69/02* (2013.01); *H04L 67/02* (2013.01); *H04L 61/1511* (2013.01); *H04L 63/0884* (2013.01); *H04L 63/166* (2013.01)

(58) Field of Classification Search
CPC ..................................... H04L 69/02
USPC ................................ 709/230, 228
See application file for complete search history.

(56) References Cited

U.S. PATENT DOCUMENTS

| 8,531,967 | B2 * | 9/2013 | Kazmi et al. | 370/236.2 |
| 2003/0072330 | A1 * | 4/2003 | Yang et al. | 370/493 |
| 2004/0267808 | A1 | 12/2004 | Matsushima | |
| 2007/0223409 | A1 * | 9/2007 | Herrero | 370/310 |
| 2008/0310449 | A1 * | 12/2008 | Cha et al. | 370/474 |
| 2011/0032898 | A1 * | 2/2011 | Kazmi et al. | 370/329 |

FOREIGN PATENT DOCUMENTS

| JP | 2004-005503 | 1/2004 |
| JP | 2004-506977 | 3/2004 |
| WO | WO 02/15002 A2 | 2/2002 |

* cited by examiner

*Primary Examiner* — Jude Jean Gilles
(74) *Attorney, Agent, or Firm* — Oblon, McClelland, Maier & Neustadt, L.L.P.

(57) ABSTRACT

The present invention provides a novel network controller that does not need extensive development resources to add and expand functions of a communications protocol with maintaining high communication quality, does not generate waste of resources, is easy to maintain, and can be applied to embedded systems. More specifically, the present invention provides a network controller that includes a network interface that communicates with a plurality of terminals via a network, an upper application interface that communicates with upper applications that utilizes a plurality of communications protocols, a protocol procedure controller that controls a plurality of protocol procedures to communicate with a plurality of terminals via a network using a plurality of communications protocols, and a protocol analyzing unit that analyzes a plurality of communications protocols and further includes a protocol header analyzing unit that analyzes a plurality of protocol headers of a plurality of communications protocols individually.

7 Claims, 35 Drawing Sheets

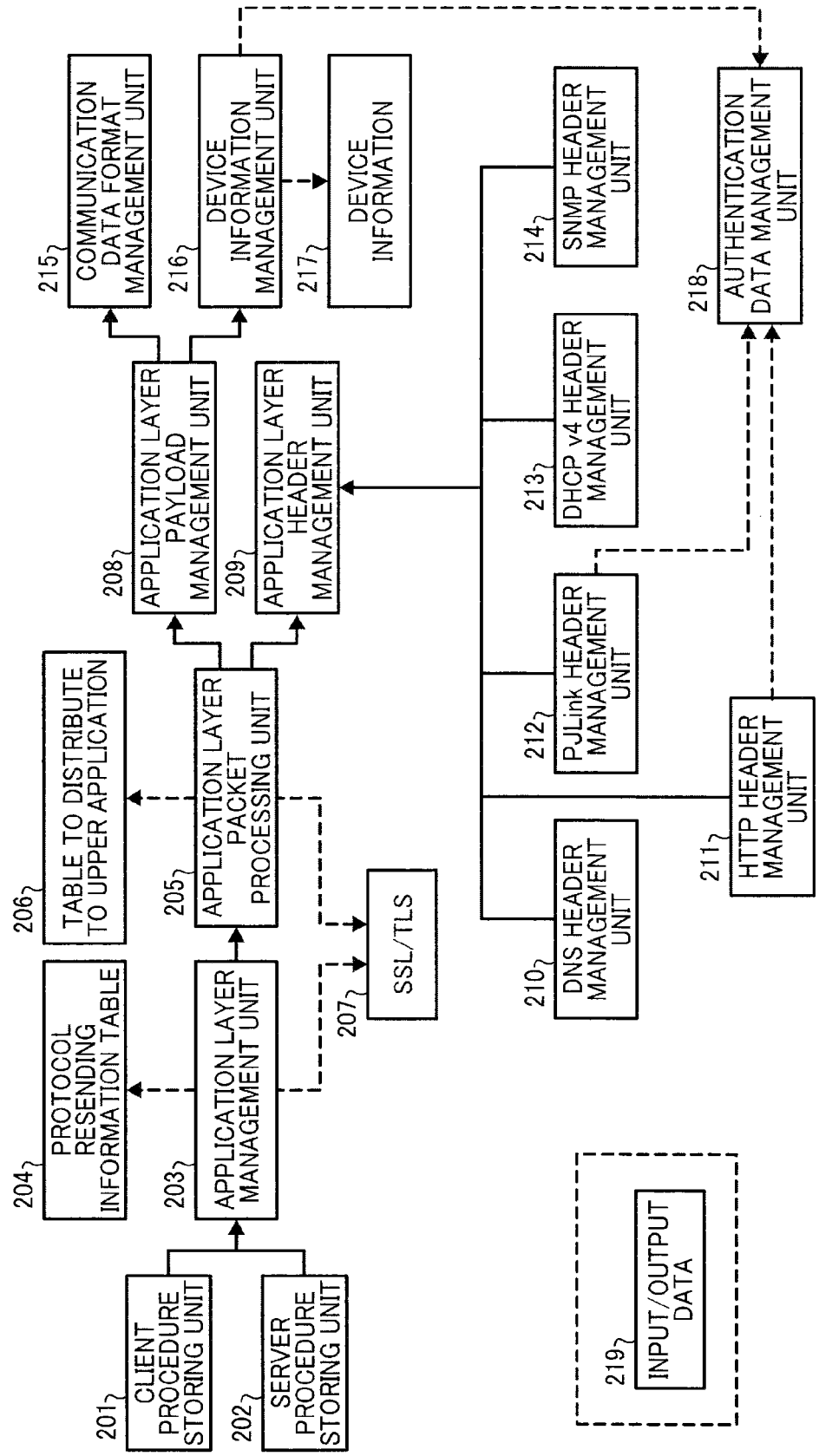

FIG. 4A

NETWORK SENDING REQUEST (REQUEST)

| NETWORK SENDING REQUEST (BEFORE DIVIDING AT APPLICATION LEVEL) |
|---|

| DIVIDED DATA SIZE | EOF | RESERVED |
|---|---|---|
| APPLICATION DATA SIZE || |
| DESTINATION | CONTROL MESSAGE ID | DETAIL ABOUT MESSAGE ID |
| COMMU-NICATION MODE | VIBRA-TION | RESERVED |
| DESTINATION HOST (256) |||
| CERTIFICATION CN NAME (256) |||
| SET OF AUTHENTICATE CERTIFICATION (4) |||
| DESTINATION PORT CERTIFICATION | PROTOCOL TYPE | USE OF PROXY GO /NO-GO |
| OPERATION IN CASE SERVER AUTHENTI-CATION FAILED | CHECK OF CN GO/ NO-GO | RESERVED |

APPLICATION 4620 BYTES=
[CONTROL PARAMETER : 524 BYTES]
[CONTENT DATA : 4096 BYTES]

| NETWORK SENDING REQUEST (REQUEST DATA 1) |
|---|

| 2032 | 0x01 | UNDEFINED |
|---|---|---|
| 2032 || |
| 0x0004 | 0x02 | 0x0D |
| 0x00 | 0x00 | UNDEFINED |
| 192.168.1.1 (256) |||
| hoge.ricoh.co.jp (256) |||
| 0x01, 0x01, 0x00, 0x00 |||
| 7443 | 0x02 | 0x01 |
| 0x02 | 0x01 | UNDEFINED |

[CONTROL PARAMETER : 524 BYTES]

[CONTENT DATA : 1508 BYTES]

FIG. 5A

NETWORK SENDING REQUEST (RESPONSE)

| RESPONSE TO NETWORK SENDING REQUEST (BEFORE DIVIDING AT APPLICATION LEVEL) |
|---|

| DIVIDED DATA SIZE | | EOF | RESERVED |
|---|---|---|---|
| APPLICATION DATA SIZE | | | |
| DESTINATION | CONTROL MESSAGE ID | DETAIL ABOUT MESSAGE ID | |
| COMMU-NICATION MODE | VIBRA-TION | RESERVED | |
| SOURCE | SENDING RESULT | RESERVED | |

APPLICATION 4 BYTES=
[CONTROL PARAMETER : 4 BYTES]
[CONTENT DATA : 0 BYTE]

| NETWORK SENDING REQUEST (RESPONSE DATA 1) |
|---|

| 4 | | 0x01 | UNDEFINED |
|---|---|---|---|
| 4 | | | |
| 0x0001 | | 0x03 | 0x0D |
| 0x00 | 0x00 | UNDEFINED | |
| 0x0004 | 0x01 (SUC-CEEDED) | UNDE-FINED | |

[CONTROL PARAMETER : 4 BYTES]

[CONTENT DATA : 0 BYTE]

FIG. 7

SHARING OF NETWORK RECEIVED DATA OF REMOTE (RESPONSE)

| RESPONSE FOR SHARING OF NETWORK RECEIVED DATA (BEFORE DIVIDING AT APPLICATION LEVEL) | | | SHARING OF NETWORK RECEIVED DATA | | |
|---|---|---|---|---|---|
| DIVIDED DATA SIZE | EOF | RESERVED | 4 | 0x01 | UNDEFINED |
| APPLICATION DATA SIZE | | | 4 | | |
| DESTINATION | CONTROL MESSAGE ID | DETAIL ABOUT MESSAGE ID | 0x0004 | 0x03 | 0x0D |
| COMMU-NICATION MODE | VIBRA-TION | RESERVED | 0x01 | 0x01 | UNDEFINED |
| RESULT OF RECEIVING | RESERVED | | 0x01 | UNDEFINED | |
| APPLICATION 4 BYTES= [CONTROL PARAMETER : 4 BYTES] [CONTENT DATA : 0 BYTE] | | | [CONTROL PARAMETER : 4 BYTES] [CONTENT DATA : 0 BYTE] | | |

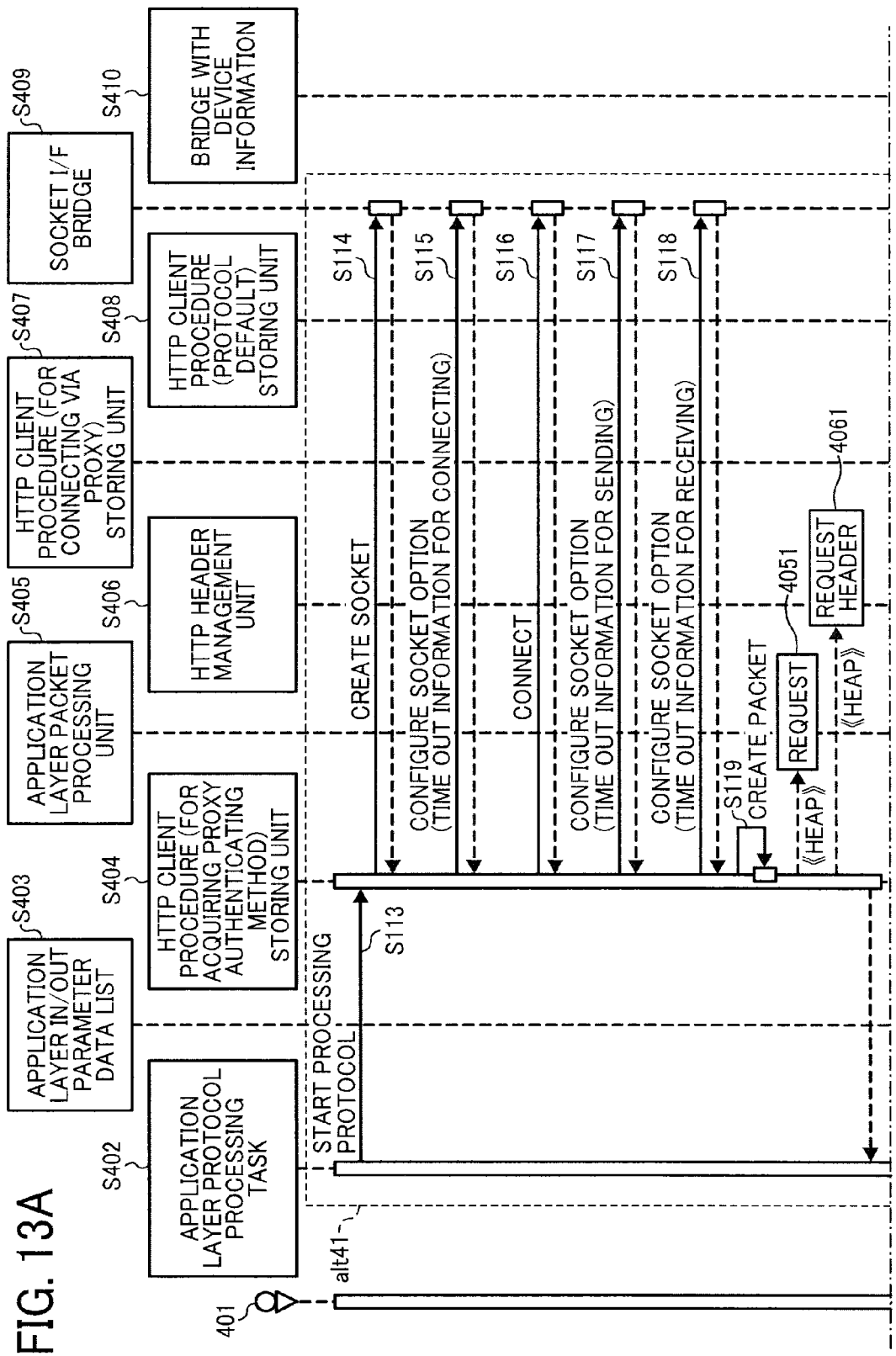

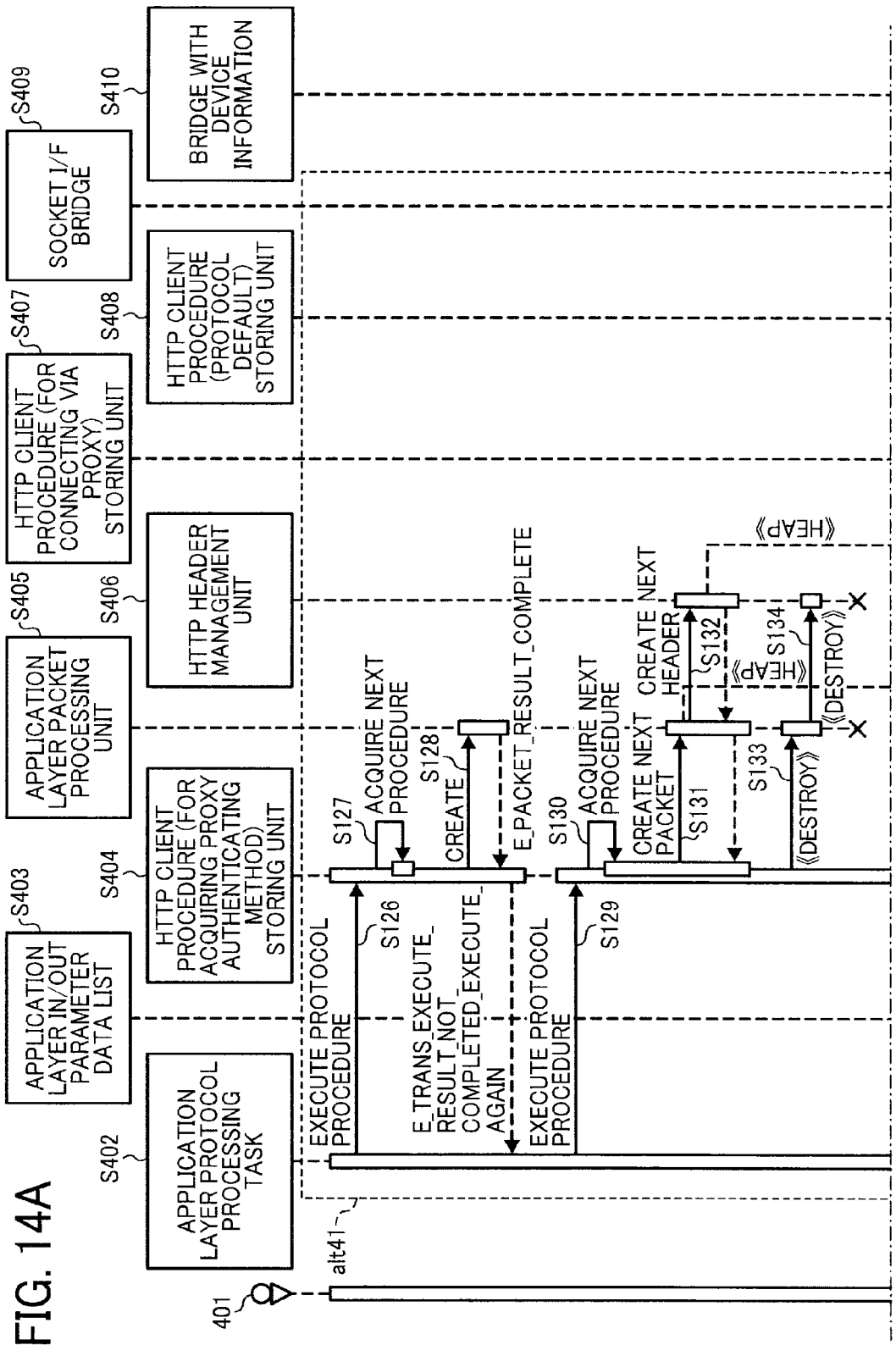

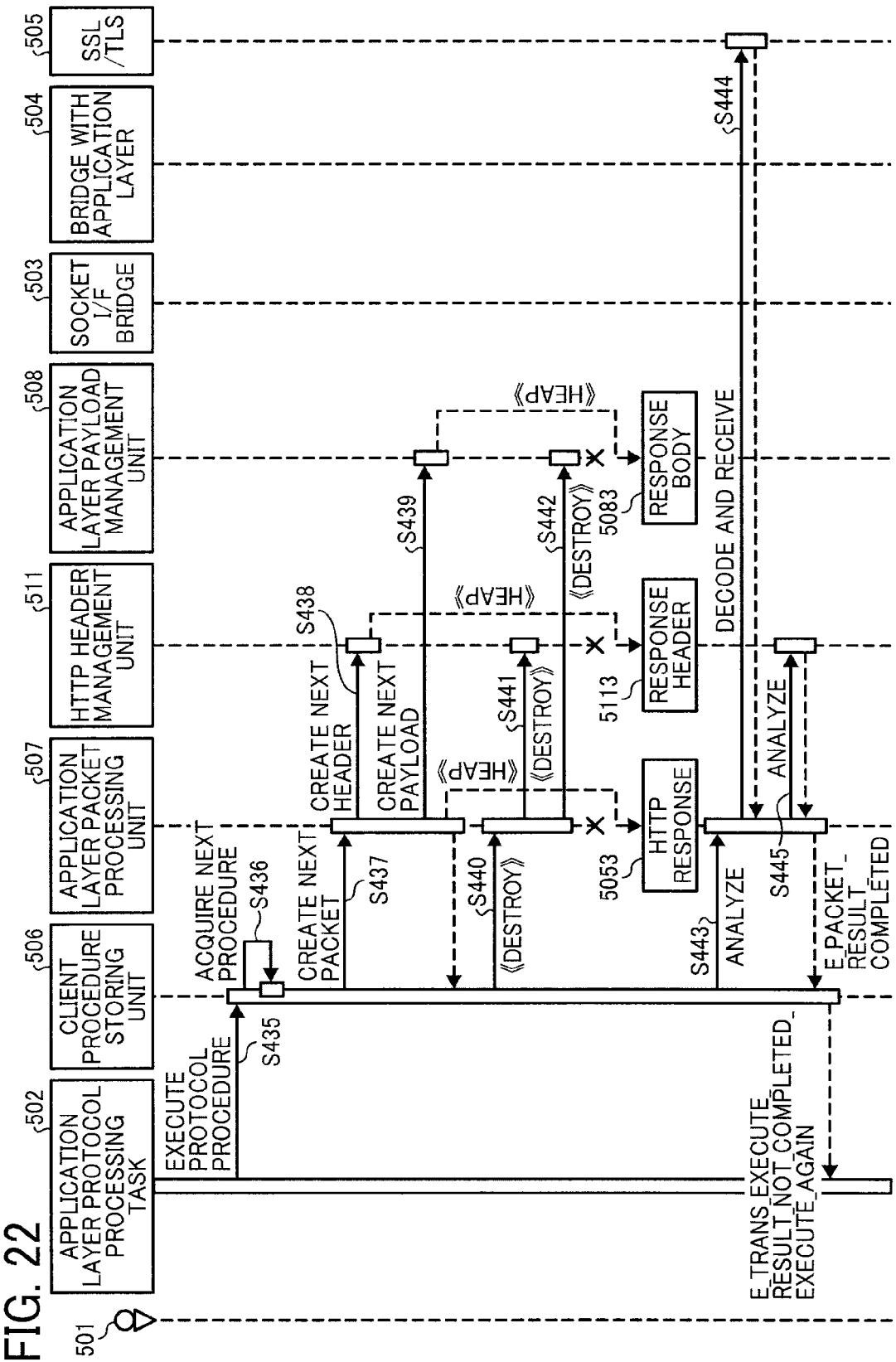

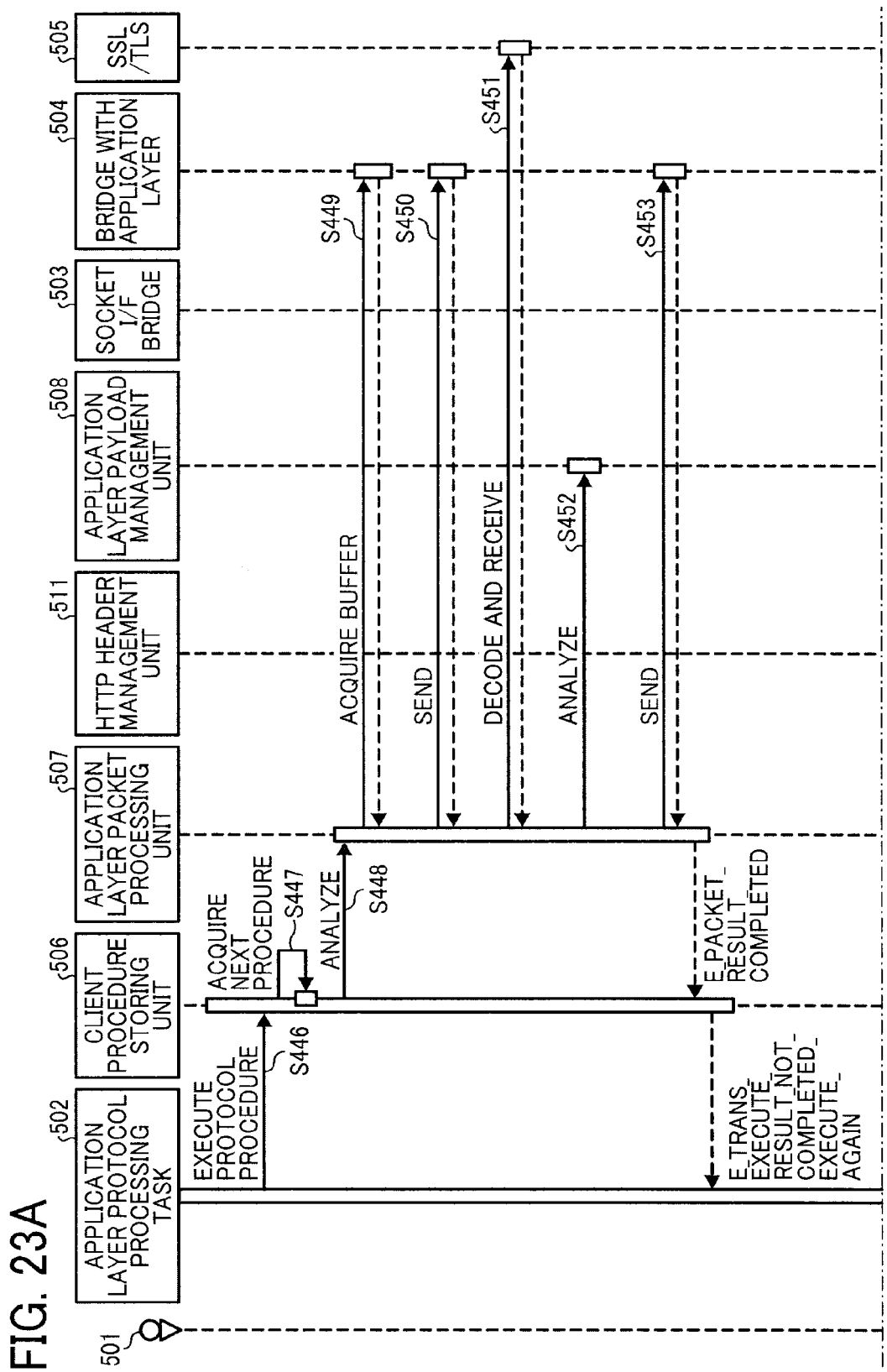

NETWORK CONTROLLER, METHOD, AND MEDIUM

CROSS-REFERENCE TO RELATED APPLICATION

This patent application is based on and claims priority pursuant to 35 U.S.C. §119 to Japanese Patent Application No. 2012-002216, filed on Jan. 10, 2012 in the Japan Patent Office, the entire disclosure of which is hereby incorporated by reference herein.

BACKGROUND OF THE INVENTION

1. Field of the Invention

The present invention relates to a network controller, method, and medium, and more particularly to a network controller that facilitates expanding functions of a communications protocol.

2. Description of the Background Art

Recently, there has been a growing trend to provide new added value by linking devices in a network. Accordingly, adding network functions and improving connectivity have become necessary. To cope with this kind of expansion, a technology that reduces development costs and facilitates adding functions by providing an API that modularizes communications protocol processing independent of application is well known.

A technology of creating protocol- and device-independent applications and contents and converting the contents into content data supported by any protocol and device using a resource description framework (RDF) has been proposed (e.g., JP-2004-506977-A.) Also, a technology of shared modularization of processes and its configuration in order to facilitate developing and adding applications that provide Web services has been proposed (e.g., JP-2004-005503-A.)

However, the technologies described in JP-2004-506977-A and JP-2004-005503-A entail substantial development resources to add and expand functions of a communications protocol. In addition, in case of running development independently for each communications protocol and diverting from existing resources such as OSS, there are many redundant processes across the whole of a communications protocol, and that leads to generate waste of resources such as ROM and RAM. This issue is especially prominent where there are limited usable resources for embedded systems.

Furthermore, the many modifications such as bug fixing required due to so many redundant processes complicate maintenance. Also, with so many ambiguous boundaries between communications protocol and application layer, in a case in which a plurality of applications exist there is a waste of development resources caused by containing a part of communication process in the applications.

SUMMARY OF THE INVENTION

The present invention provides a novel network controller, method, and medium that do not require large development resources to add and expand functions of a communications protocol with maintaining high communication quality, do not generate waste of resources, are easy to maintain, and can be applied to embedded systems.

More specifically, the present invention provides a network controller that includes a network interface that communicates with a plurality of terminals via a network, an upper application interface that communicates with upper applications that utilizes a plurality of communications protocols, a protocol procedure controller that controls a plurality of protocol procedures to communicate with a plurality of terminals via a network using a plurality of communications protocols, and a protocol analyzing unit that analyzes a plurality of communications protocols, and further includes a protocol header analyzing unit that analyzes a plurality of protocol headers of a plurality of communications protocols individually.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in conjunction with the accompanying drawings.

FIG. 3 is a diagram illustrating functional blocks of the network controller as an embodiment of the present invention.

FIGS. 4A and 4B are diagrams illustrating a data format and request data that asks to send data via a network for the network controller as an embodiment of the present invention.

FIGS. 5A and 5B are diagrams illustrating a data format and response data responding to the request data that asks to send data via a network for the network controller as an embodiment of the present invention.

FIG. 7 is a diagram illustrating a data format and response data to share received data via a network of Remote as an embodiment of the present invention.

FIGS. 13A and 13B are sequence diagrams illustrating an operation of the apparatus that includes the network controller of the second embodiment and works as a HTTP client in the present invention.

FIGS. 14A and 14B are sequence diagrams illustrating an operation of the apparatus that includes the network controller of the second embodiment and works as a HTTP client in the present invention.

FIG. 22 is a sequence diagram illustrating an operation of the apparatus that includes the network controller of the third embodiment and executes encrypted communication as a HTTP client in the present invention.

FIGS. 23A and 23B are sequence diagrams illustrating an operation of the apparatus that includes the network controller of the third embodiment and executes encrypted communication as a HTTP client in the present invention.

DETAILED DESCRIPTION OF THE INVENTION

Figure 1:
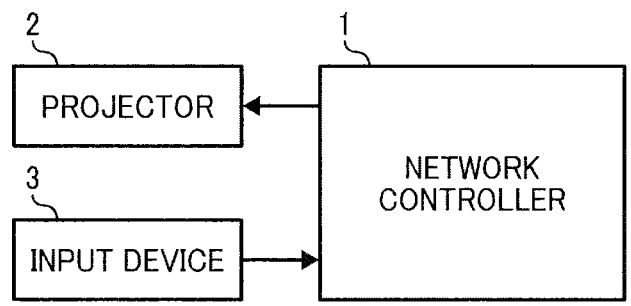
FIG. 1 is a diagram illustrating a configuration of a system including a network controller as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

In the present invention, negotiating procedure with a communication party, analyzing a packet structure, and an API which is independent from communications protocols are processes implemented for all communications protocols. Only a part that analyzes a protocol header (communication control part) is implemented separately for each protocol.

FIG. 1 is a diagram illustrating an example of a configuration of a system including a network controller as an embodiment of the present invention. In FIG. 1, the system consists of a network controller 1, a projector 2, and an input device 3.

The network controller 1 includes a user interface (UI), implements functions by applications, and controls communication with external devices. The projector 2 is a projector such as a liquid crystal projector and projects data such as images from the network controller 1 onto a wall surface, etc., using a lamp. The input device 3 such as a power button and selection buttons, etc., sends input data to the network controller 1.

Figure 2:
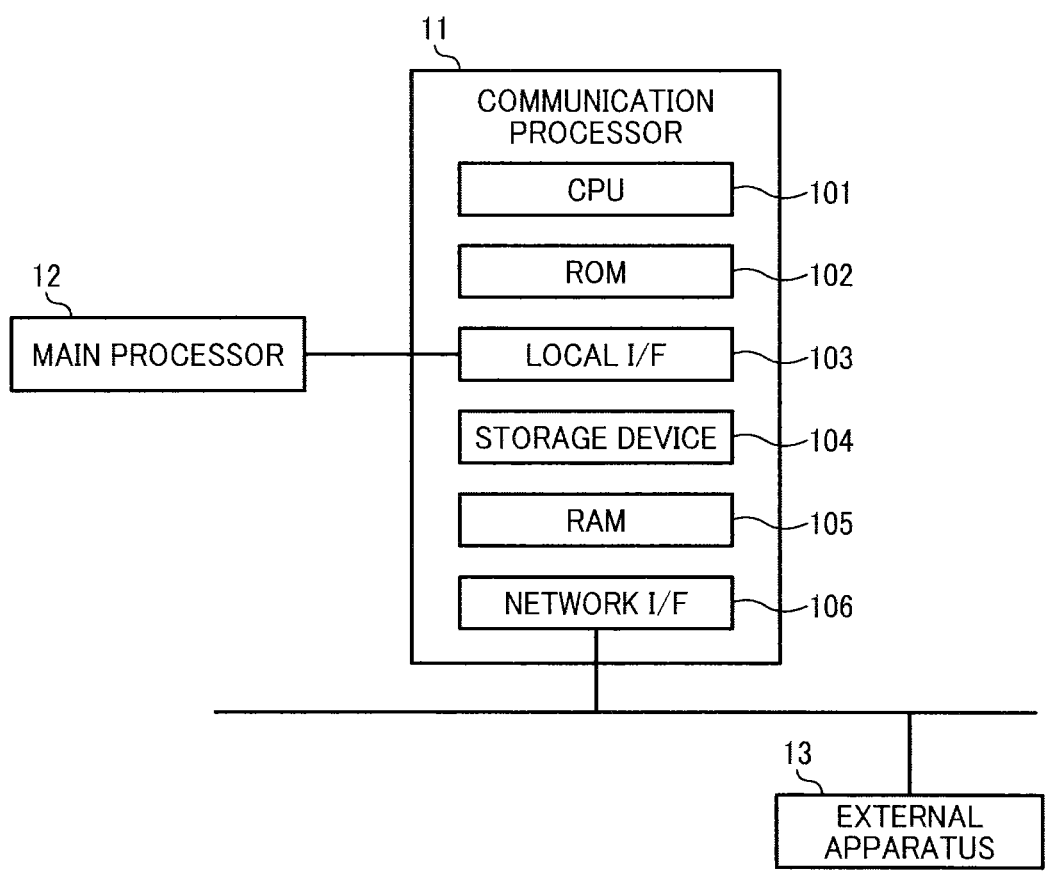
FIG. 2 is a diagram illustrating a hardware configuration of the network controller as an embodiment of the present invention.

FIG. 2 is a diagram illustrating a hardware configuration of the network controller as an embodiment of the present invention. As shown in FIG. 2, the network controller 1 consists of a communication processor 11, a main processor 12, and an external apparatus 13.

The communication processor 11 controls communication (via a network) and consists of a central processing unit (CPU) 101, a ROM 102, a local interface (I/F) 103, a storage device 104, a RAM 105, and a network I/F 106. The main processor 12 is a so-called CPU, and the external apparatus outputs image data etc. to outside like the projector described above.

The communication processor 11 is a processor that plays a major role in controlling a network by the network controller 1 in the present invention. The local I/F 103 is an interface such as USB and PCIe, and the network I/F 106 is a network interface such as wireless LAN and wired LAN.

FIG. 3 is a diagram illustrating functional blocks of the network controller as an embodiment of the present invention. As shown in FIG. 3, controlling communication by the network controller 1 of the present invention is processed by executing each function of a client procedure storing unit 201, a server procedure storing unit 202, an application layer procedure management unit 203, an application layer packet processing unit 205, an application layer payload management unit 208, an application layer header management unit 209, header management units for each protocol, a communication data format control unit 215, and a device information management unit 216.

As protocol management units, there are a DNS header management unit 210, a HTTP header management unit 211, a PJLink Header management unit 212, a DHCPv4 header management unit 213, and a SNMP header management unit 214. The application layer header management unit 209 analyzes header information from each management unit individually.

The client procedure storing unit 201 (protocol procedure controlling unit) stores specific packet sending/receiving procedure of clients after establishing connection in case the network controller controls communication as a client terminal. The client procedure storing unit 201 executes a plurality of client procedures sequentially and implements packet sending/receiving. The client procedures include a DNS client procedure, a HTTP client procedure, and a HTTP client procedure (for acquiring proxy authentication method), and the client procedure storing unit 201 executes one of those procedures concurrently.

The server procedure storing unit 202 (protocol procedure controlling unit) stores specific packet sending/receiving procedures of servers after establishing connection in case the network controller controls communication as a server.

The application layer procedure management unit 203 manages the whole progress of sending/receiving packets in an application layer. Also, the application layer procedure management unit 203 controls connecting and disconnecting communication. In that regard, the application layer procedure management unit 203 refers to timeout time and number of retries stored in a protocol resending information table 204.

The application layer packet processing unit 205 (protocol analyzing means) knows that packets in the application layer consist of a header and a payload. The application layer packet processing unit 205 creates packets for the application layer from received data from an upper layer (application) and passes them to a lower layer where the next process is executed. Also, the application layer packet processing unit 205 analyzes packets for the application layer from data received from a lower layer and passes them to an upper layer where the next process is executed. The application layer packet processing unit 205 also encodes/decodes chunks.

When the application layer packet processing unit 205 analyzes packets for the application layer from data received from a lower layer and passes them to an upper layer where the next process is executed, the application layer packet processing unit 205 refers to a table to distribute to the upper application 206 (an association table). The table to distribute to the upper application 206 will be described in detail later.

The application layer procedure management unit 203 and the application layer packet processing unit 205 use a SSL/TLS 207 if necessary. The SSL/TLS 207 controls encrypted communication in layers below the application layer. The application layer procedure management unit 203 uses the SSL/TLS 207 in SSL/TLS handshaking (such as sharing encryption key and authenticating a communication party), and the application layer packet processing unit 205 uses the SSL/TLS 207 in encrypting and decoding data to be sent and received.

The application layer payload management unit 208 (payload analyzing unit) knows the structure of the payload in the application layer.

The application layer header management unit 209 (protocol header analyzing unit) knows the structure of a header in the application layer. Furthermore, the application layer header management unit 209 includes the DNS header management unit 210, the HTTP header management unit 211, the PJLink Header management unit 212, the DHCPv4 header management unit 213, and the SNMP header management unit 214 that manage each protocol header individually.

The DNS header management unit 210 knows header structures for each type of DNS header. Also, the DNS header management unit 210 knows information stored in DNS header. Furthermore, the DNS header management unit 210 knows a communication party to whom DNS header is sent and from whom DNS header is received.

The HTTP header management unit 211 knows the structure of a HTTP header, and the PJLink header management unit 212 knows the format of a PJLink command. Also, the DHCPv4 header management unit 213 knows the structure of a DHCPv4 header, and the SNMP header management unit 214 knows the structure of a SNMP header.

The communication data format management unit 215 knows a data format of a payload in the application layer, and the device information management unit 216 knows device information management unit 217.

The authentication data management unit 218 knows the format of authentication data that can be transferred using protocols. The authentication data management unit 218 manages each authentication data of the HTTP header management unit 211, the PJLink header management unit 212, and the device information management unit 216.

The input/output data storing unit 219 stores input data and output data that correspond to protocol processing. The input/output data storing unit 219 stores input data necessary for processing protocols and processing result, and is accessed generally.

Next, the table to distribute to upper application 206 is described below with reference to Table 1A and 1B.

TABLE 1A

| | | Characteristics of content data | | | |
|---|---|---|---|---|---|
| No. | Content of data | Operation objective | Operation method | MIME type | Name of sub-system that includes operation objective |
| 1 | Generate projection job | /service/projection | POST | application/json *may not exist in some cases | OMAP |
| 2 | Projected data (still images) | /service/projection | PUT | image/jpeg | OMAP |
| 3 | Projected data (PC screens) | /service/projection | PUT | video/x-rncb | OMAP |
| 4 | Update projection job | /service/projection | PUT | application/json | OMAP |
| 5 | Acquire status of projection job | /service/projection | GET | application/json | OMAP |
| 6 | Delete projection job | /service/projection | GET | application/json | OMAP |
| 7 | Acquire device status | /state | GET | application/json | Shockley |
| 8 | Change device status | /state | PUT | application/json | Shockley |
| 9 | Acquire device information | /property | GET | application/json | Shockley |
| 10 | Change device information | /property | PUT | application/json | Shockley |

TABLE 1B

| | | Resource to be used and transfer control method | | |
|---|---|---|---|---|
| No. | Content of data | Is control information included in transferred data? | Buffer to be used | Transfer unit |
| 1 | Generate projection job | Yes | SRAM_WHIO (small size) | Buffer size or actual data size |
| 2 | Projected data (still images) | Yes | SRAM_WHIO (large size) | Buffer size or actual data size |
| 3 | Projected data (PC screens) | Yes | SRAM_WHIO (large size) | Chunk size (in units of divided data specified by communication party) |
| 4 | Update projection job | Yes | SRAM_WHIO (small size) | Buffer size or actual data size |

TABLE 1B-continued

| | | Resource to be used and transfer control method | | |
|---|---|---|---|---|
| No. | Content of data | Is control information included in transferred data? | Buffer to be used | Transfer unit |
| 5 | Acquire status of projection job | Yes | SRAM_WHIO (small size) | Buffer size or actual data size |
| 6 | Delete projection job | Yes | SRAM_WHIO (small size) | Buffer size or actual data size |
| 7 | Acquire device status | No | SRAM_DATA | Buffer size or actual data size |
| 8 | Change device status | No | SRAM_DATA | Buffer size or actual data size |
| 9 | Acquire device information | No | SRAM_DATA | Buffer size or actual data size |
| 10 | Change device information | No | SRAM_DATA | Buffer size or actual data size |

The table to distribute to upper application 206 is a distribution table that the application layer packet processing unit 205 uses when the application layer packet processing unit 205 transfers data to upper application. The table to distribute to upper application 206 provides a rule to determine "resource to be used and transfer control method."

Next, "characteristics of content data" is described below. "Characteristics of content data" can be acquired from header information (control information) of application protocol such as HTTP. There are three types of characteristics, "operation objectives", "/service/projection", "/state", and "/property", which correspond to content of each data, and they identify application of distributing destination.

There are three types of "operation methods", "POST", "PUT", and "GET" that correspond to content of each data, and they identify operation for content data included in payload.

Also, there are three types of "MIME types", "application/json", "image/jpeg", and "video/x-rncb" that correspond to content of each data, and they identify type of content data included in payload.

Furthermore, there are two types of "names of sub-system that includes operation objective", "OMAP" and "Shockley" that correspond to content of each data, and they are determined by system configuration and identify memory used for transferring each data for each transfer destination.

Next, "resource to be used and transfer control method" in Table 1B is described below. There are two types, "Yes" and "No" to "Is control information included in transferred data?", which correspond to content of each data, and they determine whether or not header information is passed to application.

Also, there are three type of "Buffer to be used", "SRAM_WHIO (small size)", "SRAM_WHIO (large size)", and "SRAM _DATA" that correspond to content of each data, and they identify buffer type used in transferring data.

Furthermore, there are two types of "Transfer units", "Buffer size or actual data size" and "Chunk size (in units of divided data specified by communication party)" that correspond to each data, and they identify units of transfer data for each transfer time.

For example, if content of data is projected data (PC screen) of No. 3, "Operation objective" is "/service/projection", "Operation method" is "PUT", "MIME type" is "video/x-rncb", and "Name of sub-system that includes operation objective" is "OMAP". Furthermore, "Is control information included in transferred data?" is "Yes", "Buffer to be used" is "SRAM_WHIO (large size)", and "Transfer unit" is "Chunk size (in units of divided data specified by communication party)".

Figure 4B:
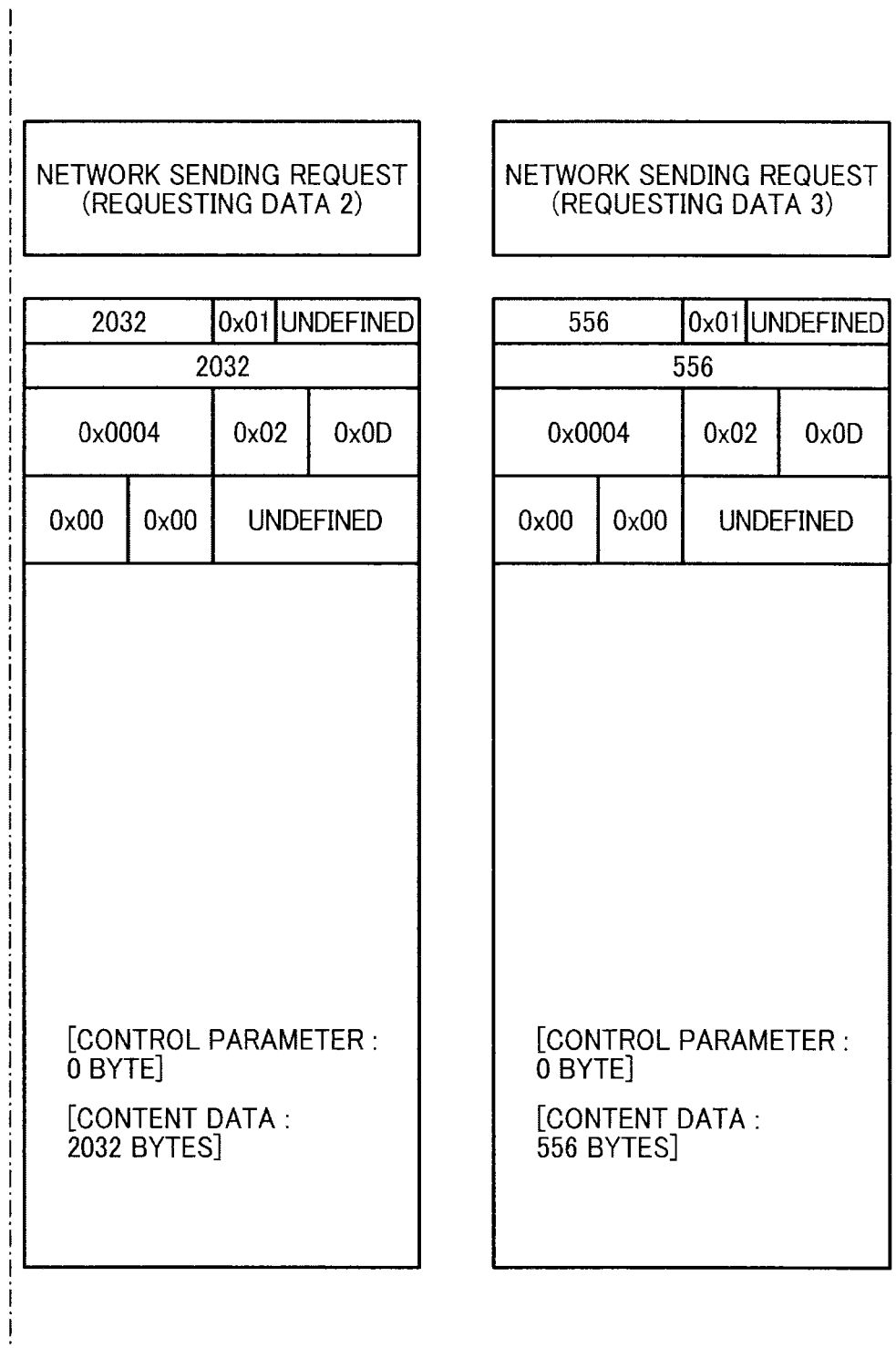

Next, data format and its examples in transferring data to a network in response to a request from an application is described below with reference to FIGS. 4A and 4B. As shown in FIGS. 4A and 4B, data is divided depending on inner resource and size of data to be sent. Data format (before dividing at application level) is shown on the left in FIG. 4A, and examples of divided data (request data 1 to 3) are shown in numerical order to the right side of FIGS. 4A and 4B.

"Divided data size" indicates size of transfer data in physical level. For example, with reference to request data 1, while application data before dividing is 4620 bytes, divided data is 2032 bytes. It should be noted that 524 bytes in 2032 bytes of divided data is allocated for control parameters since request 1 becomes data as "HTTP header/body".

"EOF" is a parameter that indicates whether or not divided data is the last data. "Application data size" is transfer data size in logic level and obviously equals the total of divided data sizes in case data is divided.

Also, "Destination" is information to exchange data within an apparatus and is a parameter that specifies the module that executes the next process. "Detail about message ID" is a parameter that specifies either request/response from application to network or request/response from network to application.

"Destination host" and "Destination port" are parameters that indicate destination information of external devices. More specifically, "Destination host" is an IP address (or domain name), and "Destination port" is a network port number.

"Protocol type" is a parameter that specifies application protocol such as HTTP and HTTPS (HTTP over SSL). Also, "Certification CN name", "Set of authenticate certification", "Operation in case server authentication failed", and "Check of certification CN go/no-go" are information used in encrypted communication by the SSL/TLS 207. They hide content of process for SSL/TLS in this embodiment by specifying all at once the information necessary for encrypted communication.

"Use of proxy go/no-go" is a parameter that specifies whether or not connection is established via proxy. It hides destination of proxy server and content of process for connecting via proxy in this embodiment. "Content data" indicates content of data to be sent to a communication party in an external device. It should be noted that descriptions of parameters in FIGS. 4A and 4B other than described above (communication mode, vibration, and reserved) are omitted since they are not related to content of process in this embodiment.

Figure 5B:
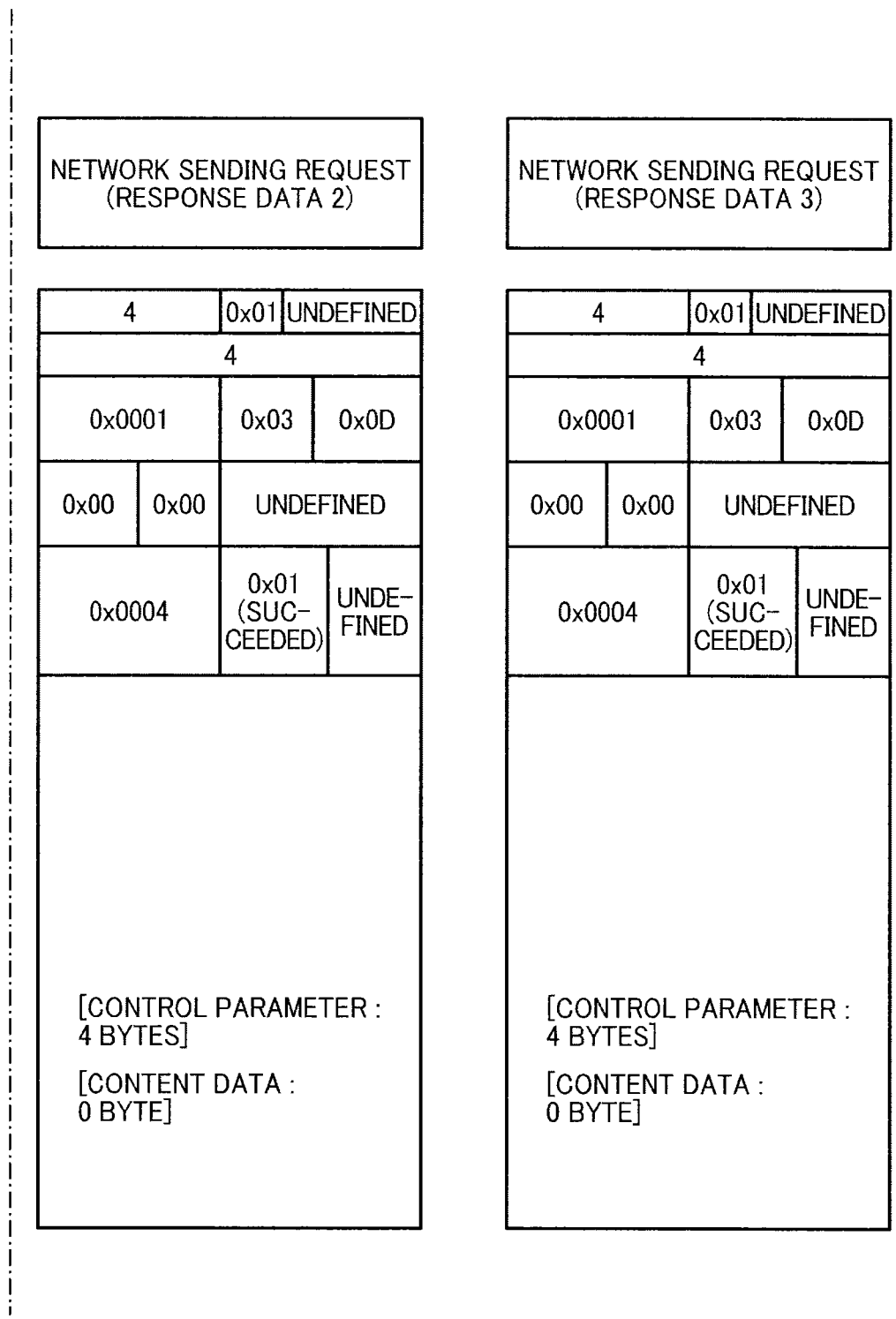

Next, response data to network sending request is described with reference to FIGS. 5A and 5B. Elements identical to those described with reference to FIGS. 4A and 4B are omitted.

"Source" is a parameter that indicates an identifier of communication module, and it is seen by application that receives this message. "Sending result" is a parameter that indicates a result of executing sending process. For example, with reference to response data 1, "Sending result" is "0x01 (succeeded)", content data is 0 byte since there is response data only, and only 4 bytes are allocated for 4 bytes of application data as control parameter.

Figure 6A:
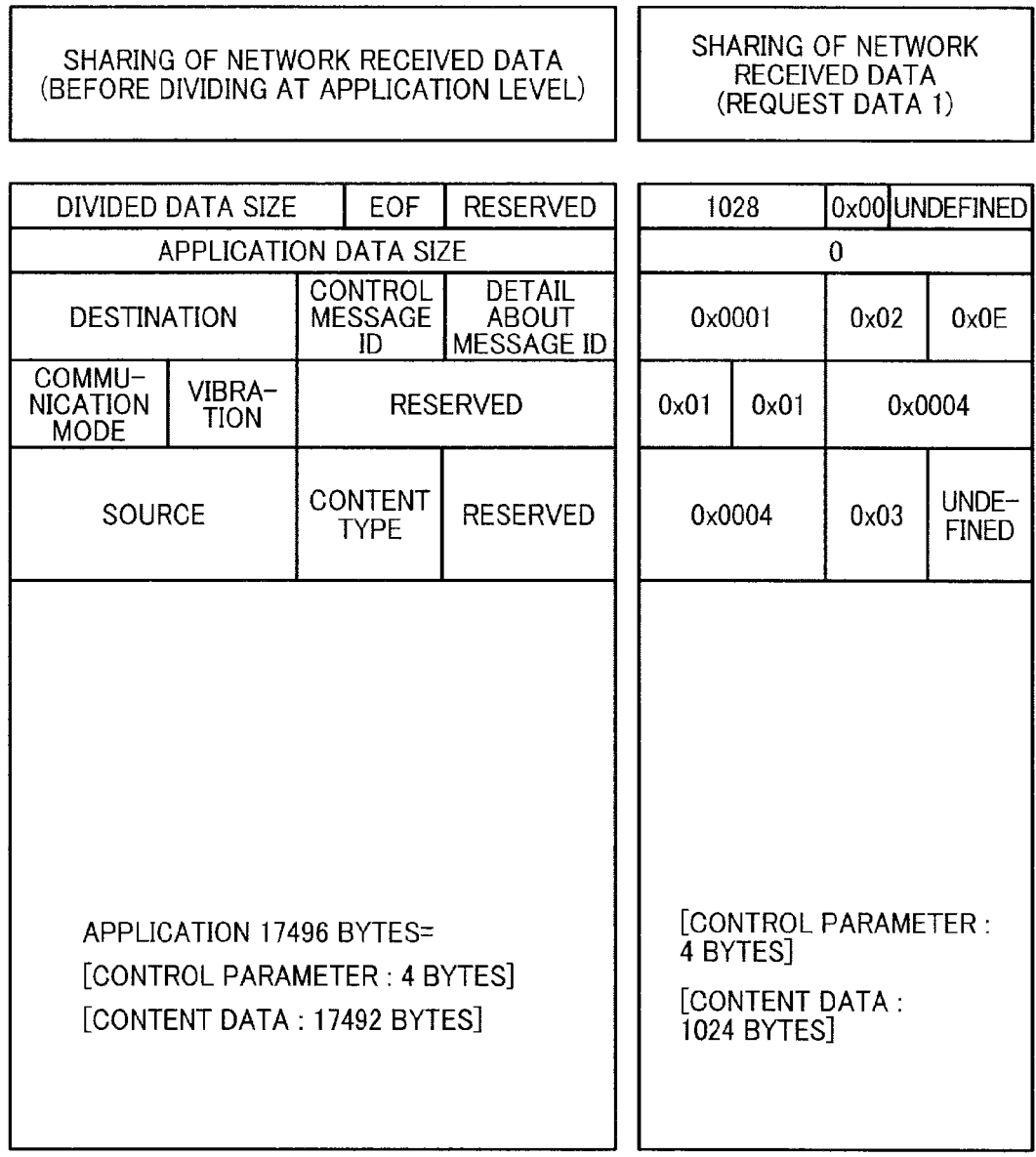
FIGS. 6A and 6B are diagrams illustrating a data format and request data that asks to share received data via a network as an embodiment of the present invention.
Figure 6B:
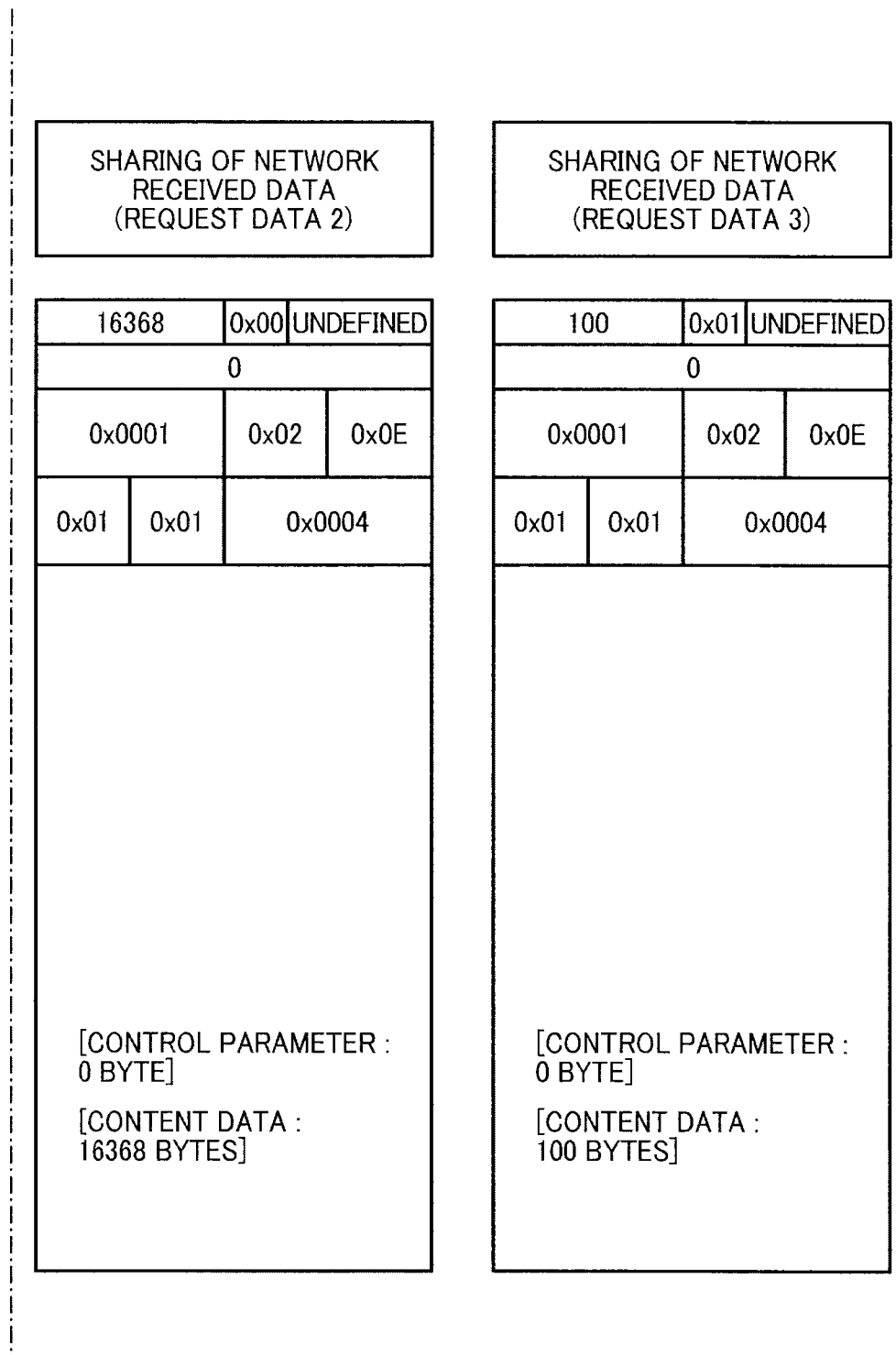

Furthermore, data format of request to share received data via network and its examples are described with reference to FIGS. 6A and 6B. Elements identical to those described with reference to FIGS. 4A and 4B are omitted. "Content type" is a data parameter that indicates content included in data.

Next, data format of response data to request to share received data via network and its examples are described with reference to FIG. 7. Elements identical to those described with reference to FIGS. 4A and 4B are omitted. As shown in FIG. 7, only 4 bytes are allocated for application data 4 bytes as control parameter since there is only response data to of receiving result.

First Embodiment

Sequence of processes in case an apparatus that includes a network controller of a first embodiment of the present invention operates as a HTTP server is described below with reference to sequence diagrams from FIG. 8 to FIGS. 11A and 11B. Processing units that execute each process are shown in the upper part of the sequence diagrams.

From left to right in sequence diagrams from FIG. 8 to FIGS. 11A and 11B, there are a person (TRANS_RXTX1_TASK) 301, an application layer protocol processing task 302, a data queue 303, a server procedure storing unit 202, an application layer packet processing unit 205, a HTTP header management unit 211, an application layer payload management unit 208, a table to distribute to upper application 206, a socket I/F bridge 304, a bridge with application layer 305, and a bridge with device information 306.

Figure 8:
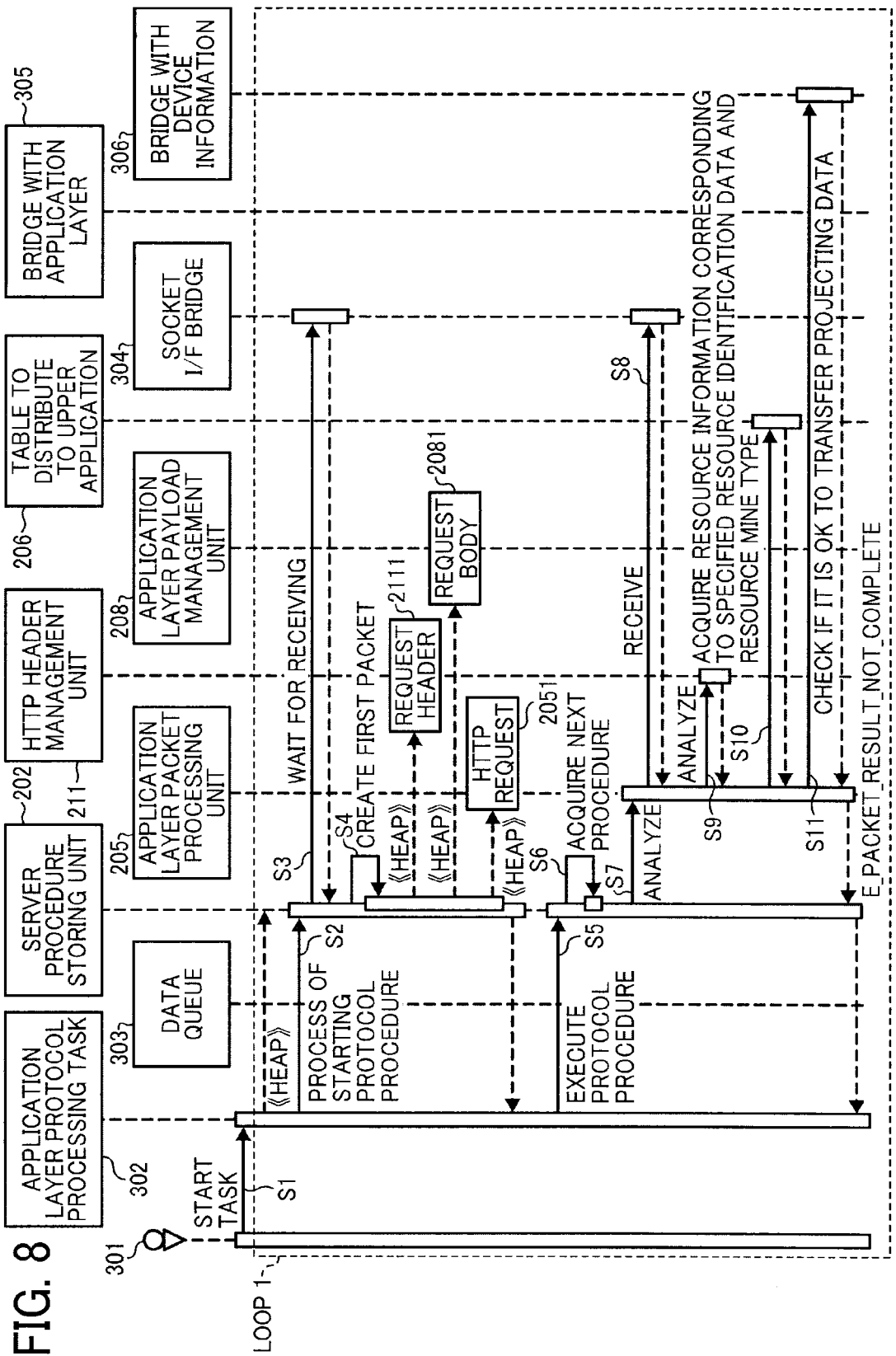
FIG. 8 is a sequence diagram illustrating an example of operation of an apparatus that includes the network controller of a first embodiment and works as a server in the present invention.

In FIG. 8, the person 301 starts the application layer protocol processing task 302 (S1). Subsequently, the application layer protocol processing task 302 executes protocol procedure starting process on the server procedure storing unit 202 (S2). The server procedure storing unit 202 waits for receiving data until another apparatus (HTTP client) connects to the server procedure storing unit 202 via the socket I/F bridge 304 (S3).

The server procedure storing unit 202 creates the first packet (S4) and allocates memory area (heap) used by application. Memory area used for HTTP request 2051 is allocated for the application layer packet processing unit 205, memory area used for the request header 2111 is allocated for the HTTP header management unit 211, and memory area used for the request body 2081 is allocated for the application layer payload management unit 208.

After the application layer protocol processing task 302 starts executing protocol procedure (S5), the server procedure storing unit 202 acquires the next procedure (S6). Subsequently, the server procedure storing unit 202 analyzes HTTP request packet (S7) received from the other device (HTTP client) via the socket I/F bridge 304 (S8).

Error handling process in case an error occurs inside Shockley during analysis of packets is described below.

If the error is a socket error, the packet returns information of finishing analyzing packet and socket error to the server procedure storing unit 202, and the server procedure storing unit 202 discards the packet and finishes the procedure. If the error is timeout error, the packet returns information of finishing analyzing packet and timeout error, and the server procedure storing unit 202 executes resending process. It should be noted that content of resending process is different for each protocol.

Furthermore, in case of error inside packet, the packet stores the error information and returns information of finishing analyzing packet and no error to the server procedure storing unit 202. When the packet creates a next packet, the packet turns over the error information to the next packet, and the packet returns error response with compose.

The application layer packet processing unit 205 analyzes HTTP request header in the HTTP header management unit 211 (S9). Subsequently, the application layer packet processing unit 205 acquires resource information that corresponds to resource identification data and resource MIME type specified by the application layer packet processing unit 205 using the table to distribute to upper application 206 (S10). Then, the application layer packet processing unit 205 checks whether or not it is OK to transfer projection data to an external device (e.g., a projector) via the bridge with device information 306 (S11). That is, the application layer packet processing unit 205 specifies transfer destination application.

It should be noted that the table to distribute to upper application 206 returns error response (E_RESOURCE_INFO_ERROR_REASON_NOT_FOUND, E_RESOURCE_INFO_ERROR_REASON_UNSUPPORTED_OPERATION, E_RESOURCE_INFO_ERROR_REASON_UNSUPPORTED_MEDIA) to the application layer packet processing unit 205 if error occurs in searching resource.

Also, in checking whether or not it is OK to transfer projection data in S11, the external device returns error response to the application layer packet processing unit 205 via the bridge with device information if for some reason it is not OK to transfer, such as the external device is in energy saving mode.

Figure 9:
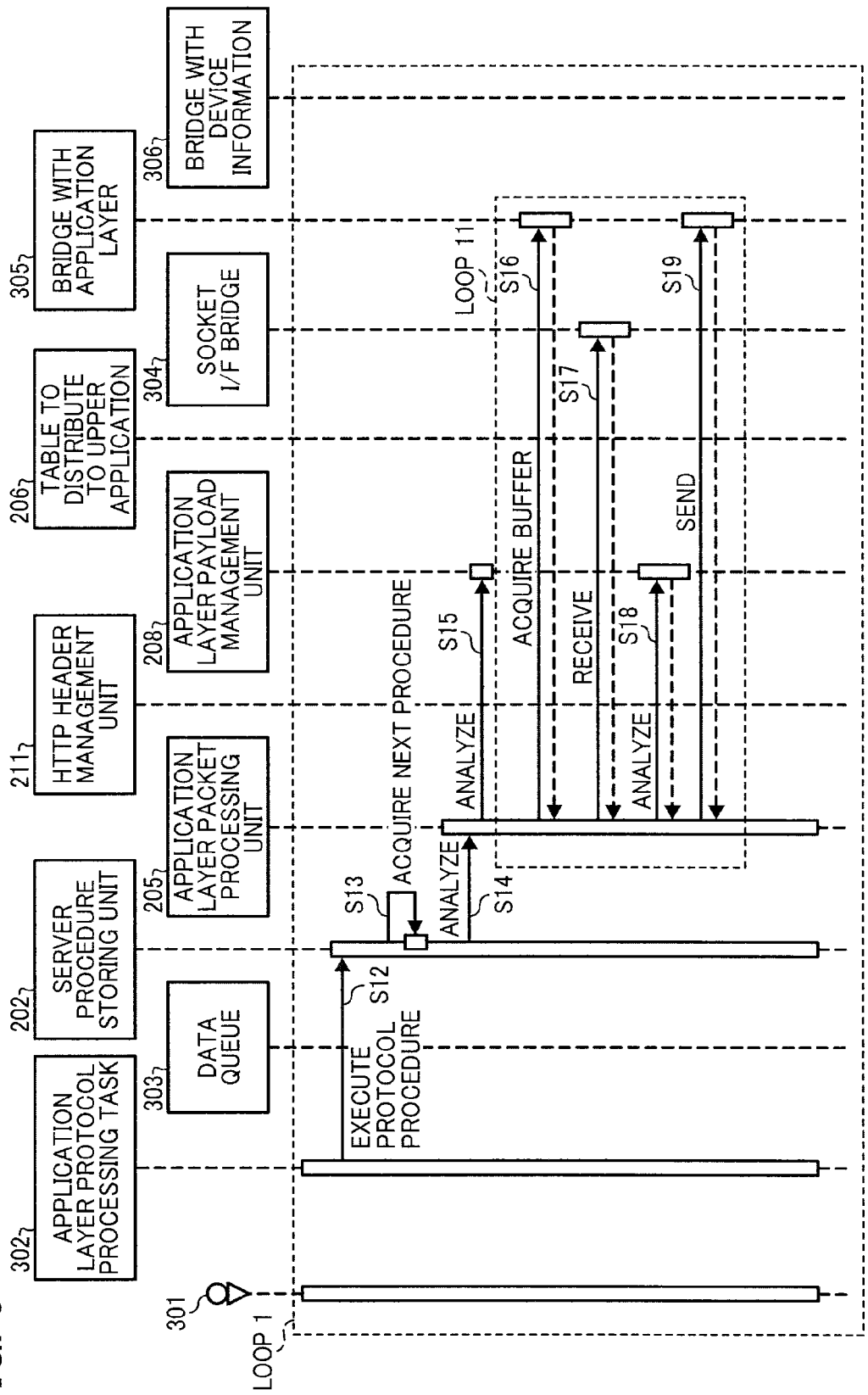
FIG. 9 is a sequence diagram illustrating an example of operation of the apparatus that includes the network controller of the first embodiment and works as a server in the present invention.

Next, as shown in FIG. 9, after receiving notice of executing protocol procedure from the application layer protocol processing task 302 (S12), the server procedure storing unit 202 acquires the next procedure (S13). Subsequently, the server procedure storing unit 202 analyzes the application layer packet processing unit 205 (S14), and the application layer packet processing unit 205 analyzes HTTP request body (S15).

The application layer packet processing unit 205 acquires buffer via the bridge with application layer 305 (S16) and receives payload data via the socket I/F bridge 304 (S17). Subsequently, the application layer packet processing unit 205 analyzes the received payload data (S18) and sends the analyzed data to application via the bridge with application layer 305 (S19).

Steps from S16 to S19 described above are communication between sub-systems and are executed by sending command to request to share received data via network. Also, the process from S16 to S19 described above is repeated until analysis of payload is finished.

It should be noted that exclusive access control is executed by SEM_TRANS_CNTNT until analysis of payload is finished in case buffer for content is acquired from user. The application layer packet processing unit 205 returns a response of undetected via the bridge with application layer 305 to the application if access to payload is controlled exclusively and the exclusive access control is not released within one second.

Also, the application layer packet processing unit 205 firstly transfers only the header to OMAP in S19 in case of content buffer. That transfer is executed when user's buffer becomes full and analysis of payload is finished in case of not chunk, and when user's buffer becomes full and analysis of payload for one chunk is finished in case of chunk.

Figure 10:
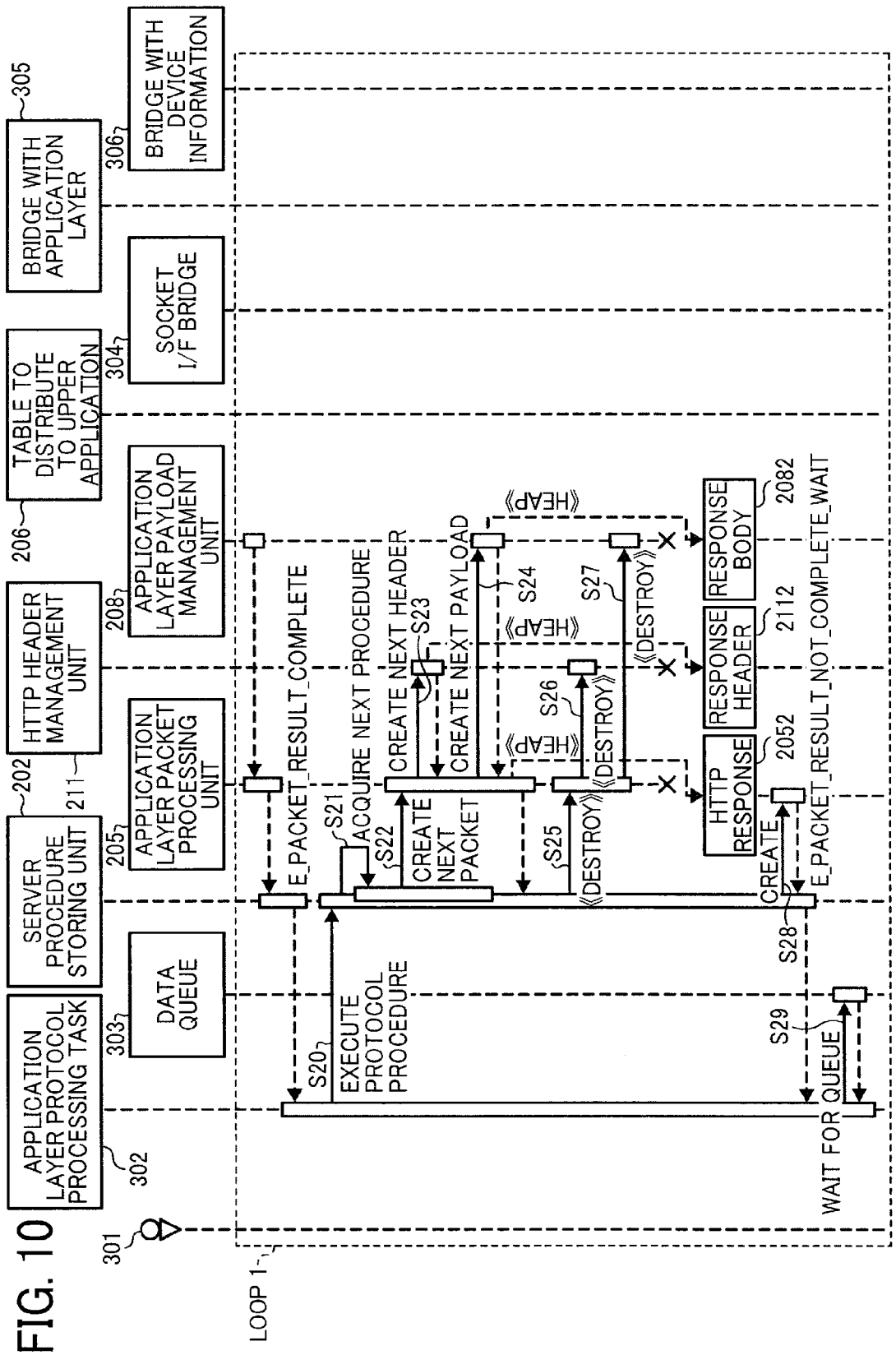
FIG. 10 is a sequence diagram illustrating an operation of the apparatus that includes the network controller of the first embodiment and works as a server in the present invention.

Next, as shown in FIG. 10, after receiving notice of executing protocol procedure from the application layer protocol processing task (S20), the server procedure storing unit 202 acquires the next procedure (S21). Subsequently, the server procedure storing unit 202 creates the next packet in the application layer packet processing unit 205 (S22), and the application layer packet processing unit 205 receives data from the application and allocates memory area for creating a HTTP response 2052 (heap).

The application layer packet processing unit 205 creates the next header in the HTTP header management unit 211 (S23), and the HTTP header management unit 211 allocates memory area for creating HTTP response header (heap).

Also, the application layer packet processing unit 205 creates the next payload in the application layer payload management unit 208 (S24), and the application layer payload management unit 208 allocates memory area for creating a HTTP response body 2082 (heap).

Along with creating the response packet, request processes by the application layer packet processing unit 205, the HTTP header management unit 211, and the application layer payload management unit 208 are finished (destroy from S25 to S27).

The server procedure storing unit 202 creates a HTTP response packet in the application layer packet processing unit 205 (S28) and waits for input data from upper application. The application layer protocol processing task 302 waits for queue from the data queue 303 (S29).

Figure 11A:
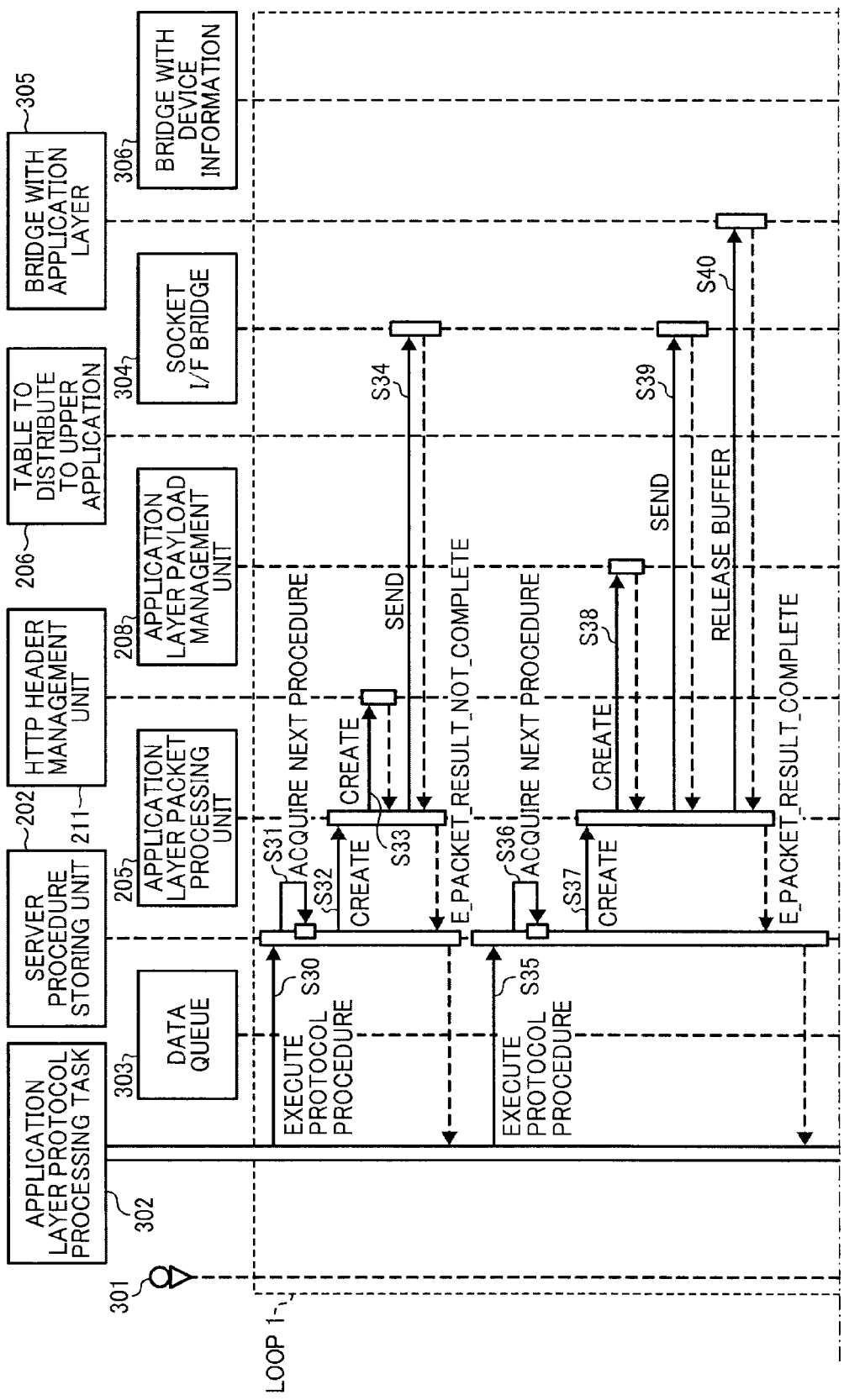
FIGS. 11A and 11B are sequence diagrams illustrating an operation of the apparatus that includes the network controller of the first embodiment and works as a server in the present invention.
Figure 11B:
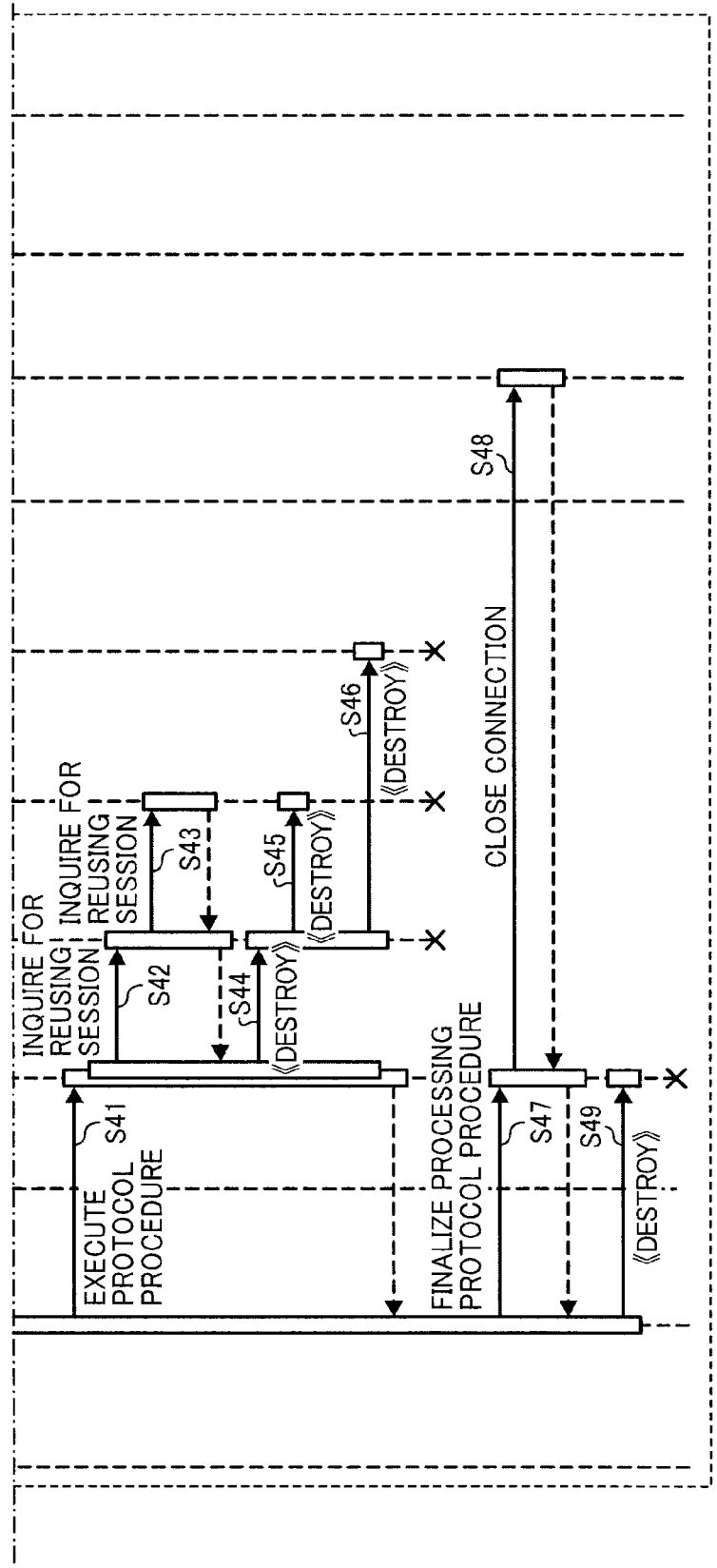

Next, as shown in FIGS. 11A and 11B, after receiving notice of executing protocol procedure from the application layer protocol processing task 302 (S30), the server procedure storing unit 202 acquires the next procedure (S31). Subsequently, the server procedure storing unit 202 creates the HTTP response 2052 in the application layer packet processing unit 205 (S32).

The application layer packet processing unit 205 creates the HTTP response header 2112 in the HTTP header management unit 211 (S33). It should be noted that, since command of response for sharing data received via network includes error information, the error information is returned as error response. Subsequently, the application layer packet processing unit 205 sends the HTTP response header 2112 to the other device (HTTP client) via the socket I/F bridge 304 (S34).

Next, after receiving notice of executing protocol procedure from the application layer protocol processing task 302 (S35), the server procedure storing unit 202 acquires the next procedure (S36). Subsequently, the server procedure storing unit 202 creates the HTTP response 5052 in the application layer packet processing unit 205 (S37).

The application layer packet processing unit 205 creates the HTTP response body 2082 in the application layer payload management unit 208 (S38). Subsequently, the application layer packet processing unit 205 sends the HTTP response body 2082 to the other device (HTTP client) via the socket I/F bridge 304 (S39). Then, the application layer packet processing unit 205 releases buffer via the bridge with application layer 305 (S40).

Next, after receiving notice of executing protocol procedure from the application layer protocol processing task 302 (S41), the server procedure storing unit 202 asks the application layer packet processing unit 205 whether or not it reuses the session (S42). Subsequently, the application layer packet processing unit 205 asks the HTTP header management unit 211 whether or not it reuses the session (S43).

If the session is reused, the process returns to waiting for receiving in S3 without closing the session (LOOP 1). If the session is not reused, the process returns to waiting for receiving in S3 after closing the session (LOOP 1).

Along with sending the response packet, response processes by the application layer packet processing unit 205, the HTTP header management unit 211, and the application layer payload management unit 208 are finished (destroy from S44 to S46).

After receiving notice of finishing protocol procedure from the application layer protocol processing task 302 (S45), the server procedure storing unit 202 disconnects from the other device (HTTP client) via the socket I/F bridge 304 (S47). Along with closing the connection, the application layer protocol processing task 302 finishes process in the server procedure storing unit 202 (destroy in S48).

It should be noted that server processes other than analyzing HTTP header and creating HTTP header are implemented in the common unit. Also, timeout processes in receiving data and waiting for notice of reusing a session etc. are implemented by referring to timeout time in the protocol resending information table 204 by the application layer procedure management unit 203.

Second Embodiment

Sequence of processes in case an apparatus that includes a network controller of a second embodiment of the present invention operates as a HTTP client is described below with reference to sequence diagrams from FIGS. 12A and 12B to FIGS. 19A and 19B. Processing units that execute each process are shown in the upper part of the sequence diagrams.

In sequence diagrams from FIGS. 12A and 12B to FIG. 15. there are a person (TRANS_RXTX1_TASK) 401, an application layer protocol processing task 402, an application layer in/out parameter data list 403, a HTTP client procedure (for acquiring proxy authentication method) storing unit 404, an application layer packet processing unit 405, a HTTP header management unit 406, a HTTP client procedure (for connecting via proxy) storing unit 407, a HTTP client procedure (protocol default) storing unit 408, a socket I/F bridge 409, and a bridge with device information 410 from left to right, and a DNS client procedure storing unit 411.

Figure 12A:
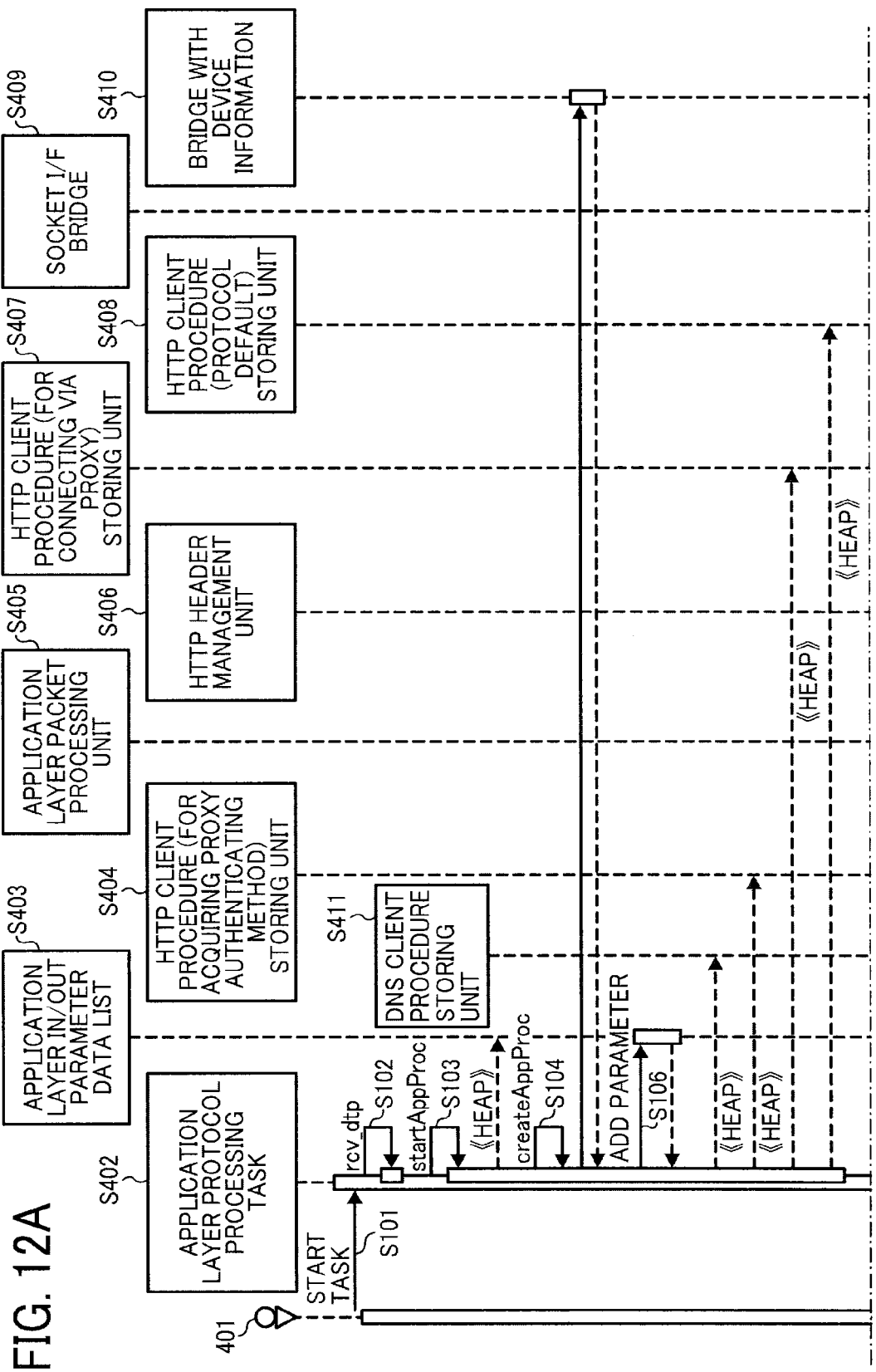
FIGS. 12A and 12B are sequence diagrams illustrating an operation of an apparatus that includes the network controller of a second embodiment and works as a HTTP client in the present invention.
Figure 12B:
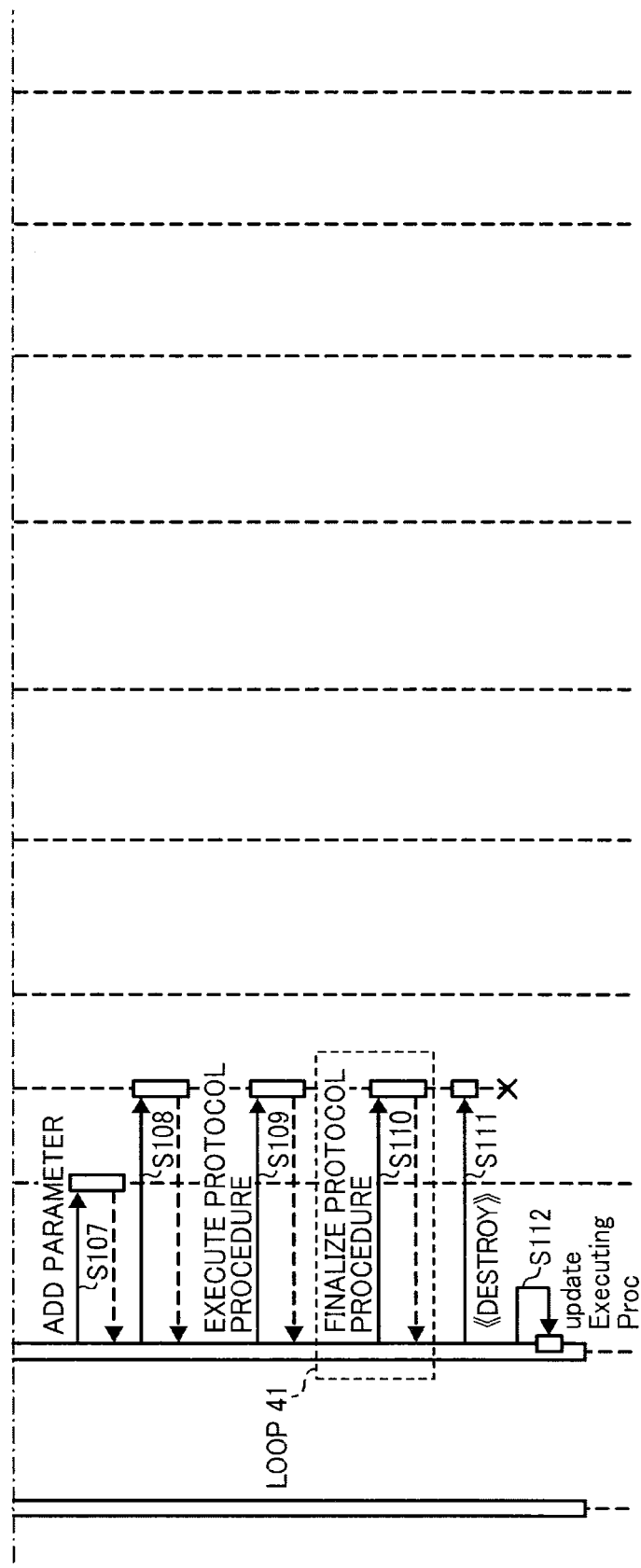

In FIGS. 12A and 12B, the person 401 starts the application layer protocol processing task 402 (S101). After executing "rcv_dtp" process (S102) and "start App Proc" process (S103), the application layer protocol processing task 402 allocates memory area in the application layer in/out parameter data list 403 (heap).

After executing "create App Proc" process (S104), the application layer protocol processing task 402 acquires setting information of an external device via the bridge with device information 410 (S105). Subsequently, the application layer protocol processing task 402 adds a parameter to the application layer in/out parameter data list 403 (S106).

In S106, "UApp Layer Param Value" structure whose value is SHostInfo structure is added to the list.

If a proxy is used as "f_host_name" in "S Host Info" structure, the name of the proxy server is acquired from INFO and set. If a proxy is not used, the destination host of request for sending via network is set.

Also, if a proxy is used as "f_host_port" in "S Host Info" structure, the port number of the proxy server is acquired from INFO and set. If a proxy is not used, the destination port of the request for sending via network is set.

The application layer protocol processing task 402 allocates memory area to execute processes in the DNS client procedure storing unit 411 (heap). In this case, DNS procedure is not generated if the destination is an IP address. It is converted to binary IP address by "get Inet Addr" and sent to constructor of HTTP procedure (network byte order).

Also, "TRANS_FALSE" is set to "fis_fixed" and "fis_received_response" in SHostInfo structure included in "App Layer List" if DNS is not used, and "TRANS_TRUE" is set to "fis_fixed" and "fis_received_response" in SHostInfo structure included in "App Layer List" if DNS is used.

Also, the application layer protocol processing task 402 allocates memory area to execute processes in the HTTP client (for acquiring proxy authentication method) procedure storing unit 404 (heap). In this case, the member that requested sending via network is checked, and HTTP client procedure (for acquiring proxy authentication method) is generated only if proxy is used.

Also, the application layer protocol processing task 402 allocates memory area to execute processes in the HTTP client procedure (for connecting via proxy) storing unit 407 (heap). In this case, the member that requested sending via network is checked, and instance of "Client Proc" is created for connecting via proxy if proxy and HTTP are used.

Furthermore, the application layer protocol processing task 402 allocates memory area to execute processes in the HTTP client procedure (protocol default) storing unit 408 (heap). In this case, the member that requested sending via network is checked, and instance of "Client Proc" is created for connecting via proxy if proxy and HTTP are used.

Next, the application layer protocol processing task 402 adds a new parameter to the application layer in/out parameter data list 403 (S107). In this case, "UApp Layer Param Value" structure whose value is "S User Data" structure is added to the list.

The application layer protocol processing task 402 executes sequentially starting protocol procedure (S108), executing protocol procedure (S109), and finishing protocol procedure (S110) in the DNS client procedure storing unit 411. In this case, "fipv4 _address" and "fis_fixed" in "S Host Info" structure included in "App Layer Param List" are set as a result of resolving name.

The process in S110 described above is repeated until procedure of DNS client is finished (LOOP 41). Also, if a socket error occurs (including cancel) by the end of each client procedure, the error process described below is executed.

That is, (a) process that deletes running procedure and waiting procedure, (b) process that releases user buffer of request for sending via network, and (c) process that returns a response to a request for sending via network to OMAP (failed to connect to host: 0x02).

Subsequently, the application layer protocol processing task 402 finishes process in the DNS client procedure storing unit 411 (destroy in S111) and executes "update Executing Proc" process (S112).

If destination information is fixed in S112 (Host Info->fis_fixed is TRANS_TRUE), waiting process is executed secondly (set to the_executing_proc).

If destination information is not fixed in S112 (Host Info->fis_fixed is TRANS _FALSE) and there is a response after querying primary DNS server (Host Info->fis_received_response is TRANS_TRUE), error response (failed to connect to host: 0x02) is returned.

If there is no response after querying primary DNS server (Host Info->fis_received_response is TRANS_FALSE), DNS procedure object is created and executed making destination secondary DNS server. In this case, if secondary DNS server is "0.0.0.0", error response (failed to connect to host: 0x02) is returned. Also, if name cannot be resolved after inquiring secondary DNS server, error response (failed to connect to host: 0x02) is returned.

Figure 13B:
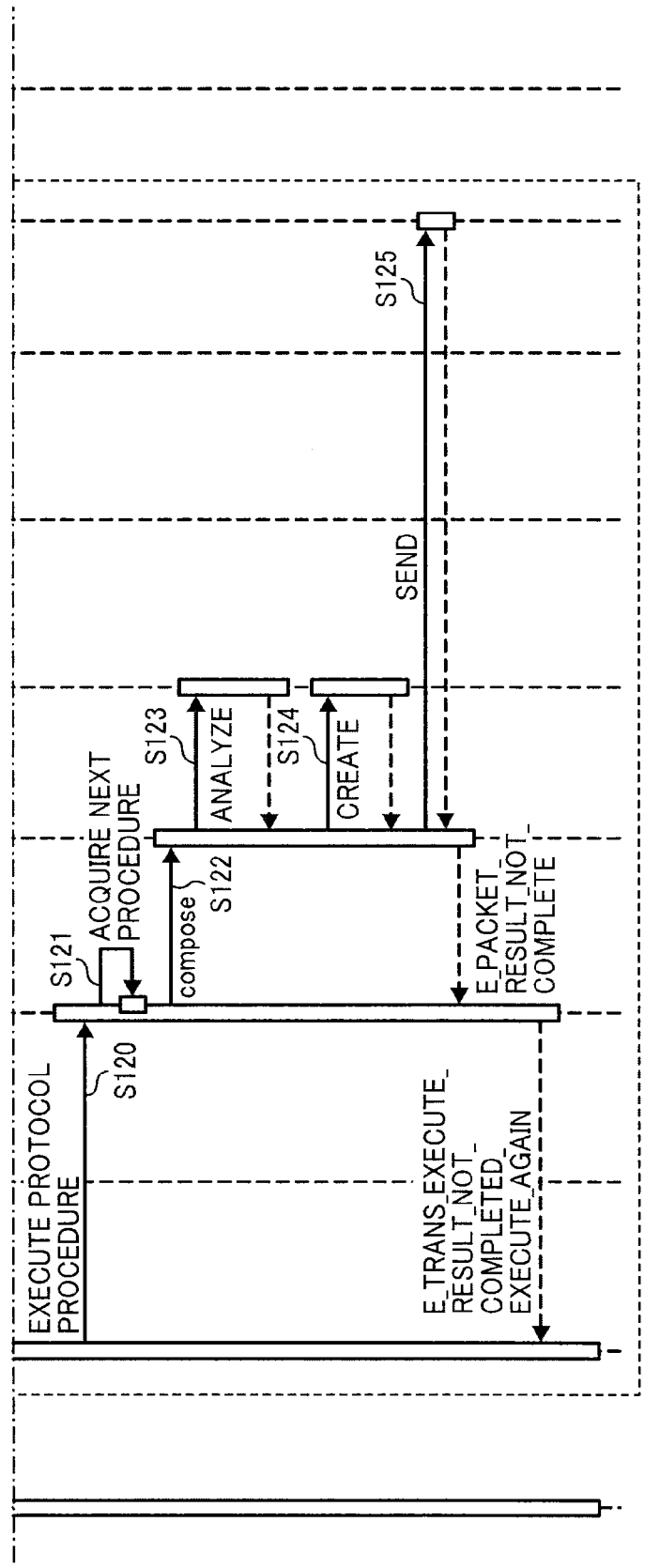

Next, in FIGS. 13A and 13B, the application layer protocol processing task 402 starts protocol procedure in the HTTP client procedure (for acquiring proxy authentication method) storing unit 404 (S113).

The HTTP client procedure (for acquiring proxy authentication method) storing unit 404 creates a socket (S114), sets socket option (connection timeout information) (S115), executes connecting process (S116), sets socket option (sending timeout information) (S117), and sets socket option (receiving timeout information) (S118) in the socket I/F bridge 409.

In creating a packet (S119), the HTTP client procedure (for acquiring proxy authentication method) storing unit 404 allocates memory area for creating request 4051 in the application layer packet processing unit 405 and creating request header 4061 in the HTTP header management unit 406 (heap).

Next, after receiving notice of executing protocol procedure from the application layer protocol processing task 402 (S120), the HTTP client procedure (for acquiring proxy authentication method) storing unit 404 acquires the next procedure (S121). Subsequently, the HTTP client procedure (for acquiring proxy authentication method) storing unit 404 executes process of "compose (action indicated by get Next Action, E_NEXT_ACTION_COMPOSE)" (S122).

The application layer packet processing unit 405 executes analyzing process in the HTTP header management unit 406 (S123). This process is for analyzing HTTP header included in request for sending via network from OMAP. In this case, member that requested sending via network is checked, and request URI is converted to absolute URI.

The application layer packet processing unit 405 creates the request header 4061 in the HTTP header management unit 406 (S124) and sends a request packet to the other terminal via the socket I/F bridge 409 (S125).

Figure 14B:
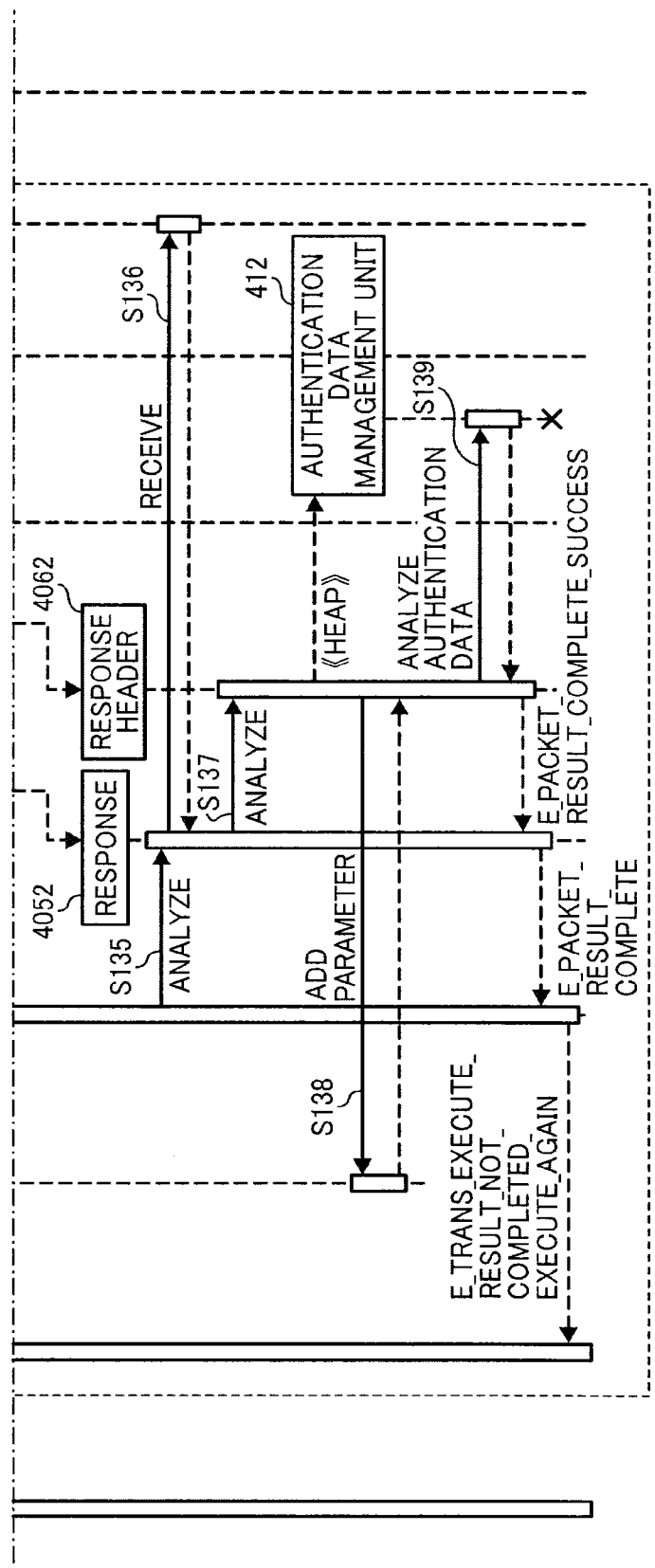

Next, as shown in FIGS. 14A and 14B, after receiving notice of executing protocol procedure from the application layer protocol processing task 402 (S126), the HTTP client procedure (for acquiring proxy authentication method) storing unit 404 acquires the next procedure (S127). Subsequently, the HTTP client procedure (for acquiring proxy authentication method) storing unit 404 creates request 4051 (S128).

Next, after receiving notice of executing protocol procedure from the application layer protocol processing task 402 (S129), the HTTP client procedure (for acquiring proxy authentication method) storing unit 404 acquires the next procedure (S130). Subsequently, the HTTP client procedure (for acquiring proxy authentication method) storing unit 404 creates the next packet in the application layer packet processing unit 405 (S131) and allocates memory area for creating response 4052 (heap).

The application layer packet processing unit 405 creates the next header in the HTTP header management unit 406 (S132) and allocates memory area for creating response header 4062 (heap).

Next, the HTTP client procedure (for acquiring proxy authentication method) storing unit 404 finishes processes in the application layer packet processing unit 405 and the HTTP header management unit 406 (destroy in S133 and S134)

Next, the HTTP client procedure (for acquiring proxy authentication method) storing unit 404 executes analyzing process in the application layer packet processing unit 405 (S135). Subsequently, the application layer packet processing unit 405 receives HTTP response via the socket I/F bridge 409 (S136).

The application layer packet processing unit 405 executes analyzing process in the HTTP header management unit 406 (S137) and allocates memory area for picking up authentication data in the authentication data management unit 412 (heap).

In this case, if status code is 417 (Proxy-Authenticate), "Auth Info" is created and "U App Layer Param Value" whose value is "Auth Info" is added to "App Layer Param List" since the header includes authentication data.

Alternatively, if status code is not 417, it is assumed that there is no proxy authentication. In this case, "Auth Info" is not created and "U App Layer Param Value" whose value is "Auth Info" is not added to "App Layer Param List".

The HTTP header management unit 406 adds a parameter in the application layer in/out parameter data list 403 (S138). Subsequently, the HTTP header management unit 406 analyzes the authentication data in the authentication data management unit 412 (S139).

If "TRANS_FALSE" is returned in S139, "S Auth Info->fis_failed" is set to "TRANS_TRUE". If (e) authentication method is not supported or (f) there is format error in authentication data, "decompose" is set to "TRANS_FALSE".

Figure 15:
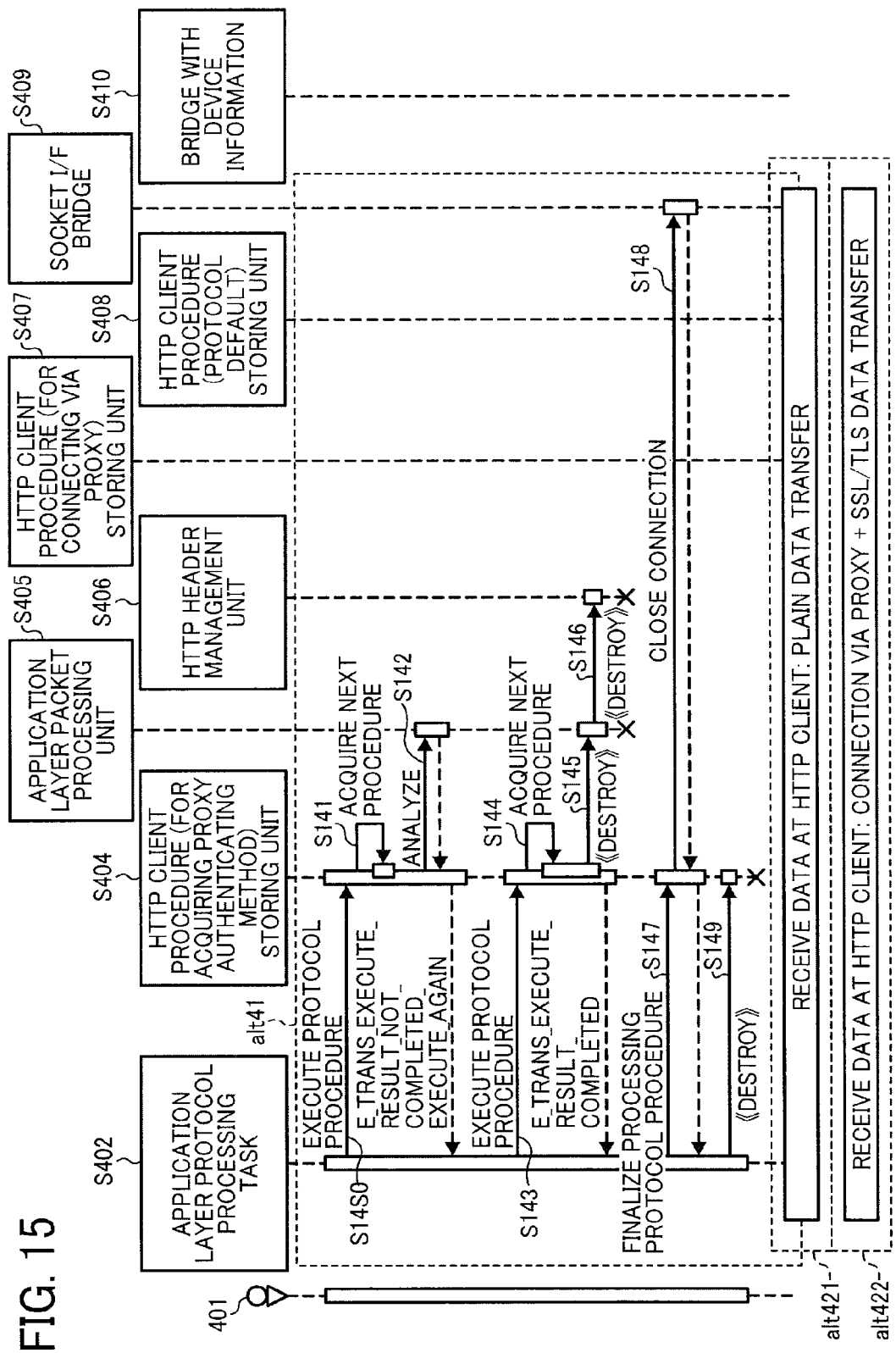
FIG. 15 is a sequence diagram illustrating an operation of the apparatus that includes the network controller of the second embodiment and works as a HTTP client in the present invention.

Next, as shown in FIG. 15, after receiving notice of executing protocol procedure from the application layer protocol processing task 402 (S140), the HTTP client procedure (for acquiring proxy authentication method) storing unit 404 acquires the next procedure (S141). Subsequently, the HTTP client procedure (for acquiring proxy authentication method) storing unit 404 analyzes response in the application layer packet processing unit 405 (S142).

Next, after receiving notice of executing protocol procedure from the application layer protocol processing task 402 (S143), the HTTP client procedure (for acquiring proxy authentication method) storing unit 404 acquires the next procedure (S144). Subsequently, the HTTP client procedure (for acquiring proxy authentication method) storing unit 404 finishes process in the application layer packet processing unit 405 (destroy in S145), and the application layer packet processing unit 405 finishes process in the HTTP header management unit 406 (destroy in S146).

The application layer protocol processing task 402 executes process of finishing protocol procedure in the HTTP client procedure (for acquiring proxy authentication method) storing unit 404 (S147), and the HTTP client procedure (for acquiring proxy authentication method) storing unit 404 closes connection to the socket I/F bridge 409 (S148).

Next, the application layer protocol processing task 402 finishes process in the HTTP client procedure (for acquiring proxy authentication method) storing unit 404 (destroy in S149). In this case, if "S Auth Info->fis_failed" of "App Param List" is "TRANS_TRUE", (g) response to request to send via network (failed to authenticate proxy: 0x06) is returned to OMAP, (h) executing procedure and waiting procedure are deleted, and (i) user buffer for request to send via network is released.

Subsequently, the process branches to alt 421 (receiving information at HTTP client with transferring plain data) or to alt422 (receiving information at HTTP client with connecting via proxy and transferring data in SSL/TLS).

Image forming apparatus case in which the process branches to alt421 (receiving information at HTTP client with transferring plain data) is described below with reference to FIGS. 16A and 16B.

Figure 16A:
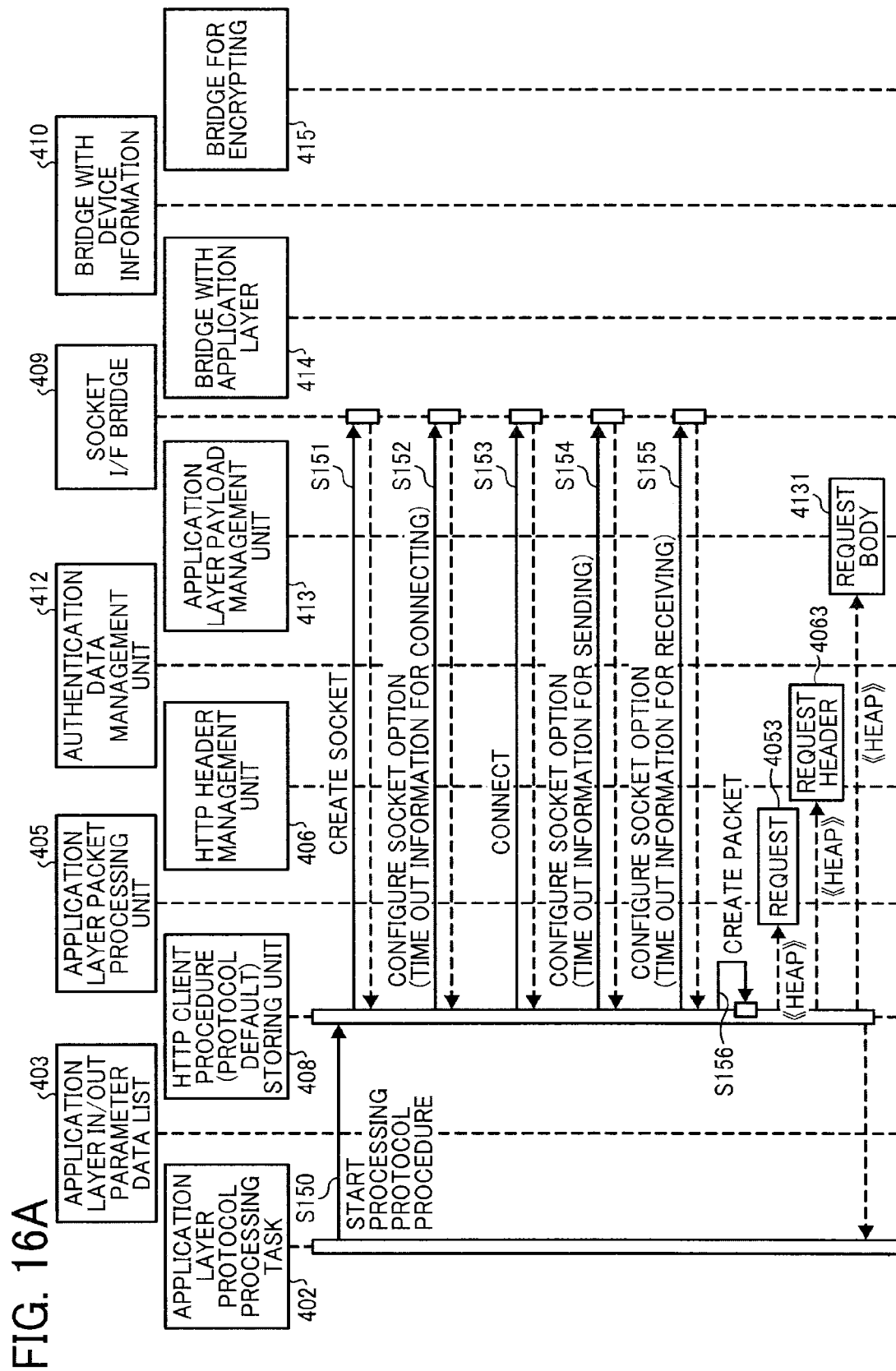
FIGS. 16A and 16B are sequence diagrams illustrating an operation of the apparatus that includes the network controller of the second embodiment and works as a HTTP client in the present invention.
Figure 16B:
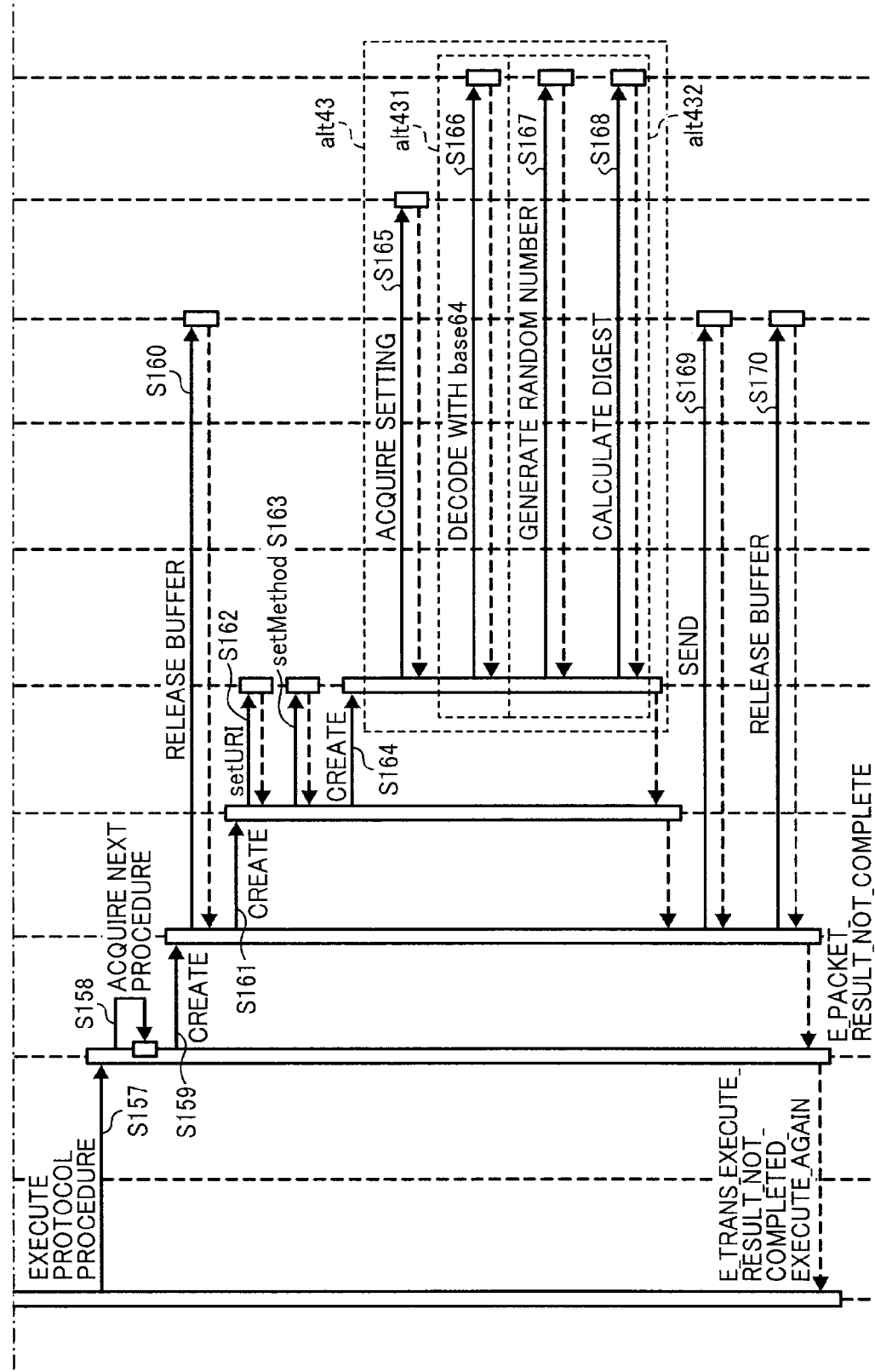

Left to right in FIGS. 16A and 16B, there are the application layer protocol processing task 402, the application layer in/out parameter data list 403, the HTTP client procedure (protocol default) storing unit 408, the application layer packet processing unit 405, the HTTP header management unit 406, the authentication data management unit 412, the application layer payload management unit 413, the socket I/F bridge 409, the bridge with application layer 414, the bridge with device information 410, and a bridge for encrypting 415.

After receiving notice of starting protocol procedure from the application layer protocol processing task 402 (S150), the HTTP client procedure (protocol default) storing unit 408 creates socket in the socket I/F bridge 409 (S151). If an error occurs in starting protocol procedure, error processes such as (j) deleting executing procedure, (k) releasing user buffer for request to send via network, and (l) returning response to request to send via network (failed to connect to host: 0x02) to OMAP are executed.

Next, the HTTP client procedure (protocol default) storing unit 408 sets socket option (connection timeout information) (S152), executes connecting process (S153), sets socket option (sending timeout information) (S154), and sets socket option (receiving timeout information) (S155) in the socket I/F bridge 409.

In creating a request packet (S156), the HTTP client procedure (protocol default) storing unit 408 allocates memory area for creating request 4053 in the application layer packet processing unit 405, creating request header 4063 in the HTTP header management unit 406, and creating request body 4131 in the application layer payload management unit 413 (heap).

Next, after receiving notice of executing protocol procedure from the application layer protocol processing task 402 (S157), the HTTP client procedure (protocol default) storing unit 408 acquires the next procedure (S158). Subsequently, the HTTP client procedure (protocol default) storing unit 408 creates the request 4053 in the application layer packet processing unit 405 (S159).

The application layer packet processing unit 405 releases buffer in the bridge with application layer 414 (S160). In this case, only in case of location free, content buffer acquired from user is used for sending buffer of packets. The reason why this process is executed is size of HTTP header can exceed by 8 Kbytes in case of location free.

Next, the application layer packet processing unit 405 creates the request header 4063 in the HTTP header management unit 406 (S161). The HTTP header management unit 406 executes "setURI" process (S162) and "setMethod" process (S163) in the authentication data management unit 412.

The HTTP header management unit 406 creates authentication data in the authentication data management unit 412 (S164). In this case, the process branches to alt43 only in case of using proxy. Also, in that case, user name and password used for authentication are acquired from INFO. It should be noted that it is determined by availability of AuthInfo whether proxy is used or not.

In branched alt 43, the authentication data management unit 412 acquires settings from external device via the bridge with device information 410 (S165). Subsequently, the process branches to alt431 in case of Basic authentication and to alt 432 in case of digest authentication.

In alt431, the authentication data management unit 412 decodes with "base64" in the bridge for encrypting 415 (S166). Alternatively, in alt432, the authentication data management unit 412 generates random numbers in the bridge for encrypting 415 (S167) and executes digest calculation (S168).

The application layer packet processing unit 405 sends a request packet to the other device via the socket I/F bridge 409 (S169) and releases buffer (S170). This process is executed because content buffer acquired from user is used for sending buffer of packet.

Also, content buffer acquired from user cannot be released without executing "dh Start" process. Consequently, content buffer acquired in "get Dh Buf As Packet" process is kept, and the kept content buffer is returned when "get Dh Buf" is called next time.

Furthermore, in case of location free, content buffer is released without exception since response to request to send via network is returned and "get Dh Buf/dh Start" process is automatically executed after executing "free Dh Buf As Packet" process.

Figure 17A:
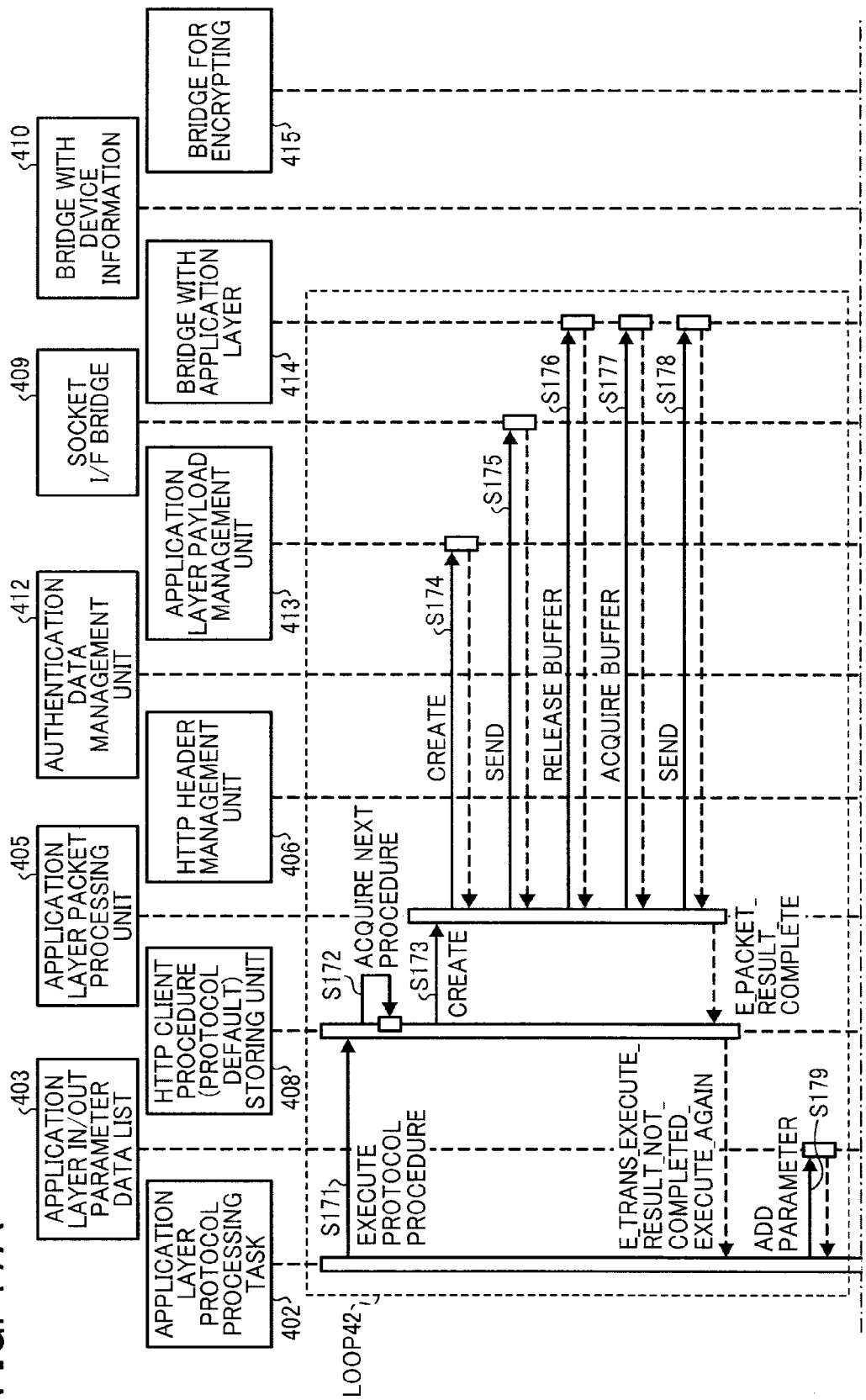
FIGS. 17A and 17B are sequence diagrams illustrating an operation of the apparatus that includes the network controller of the second embodiment and works as a HTTP client in the present invention.
Figure 17B:
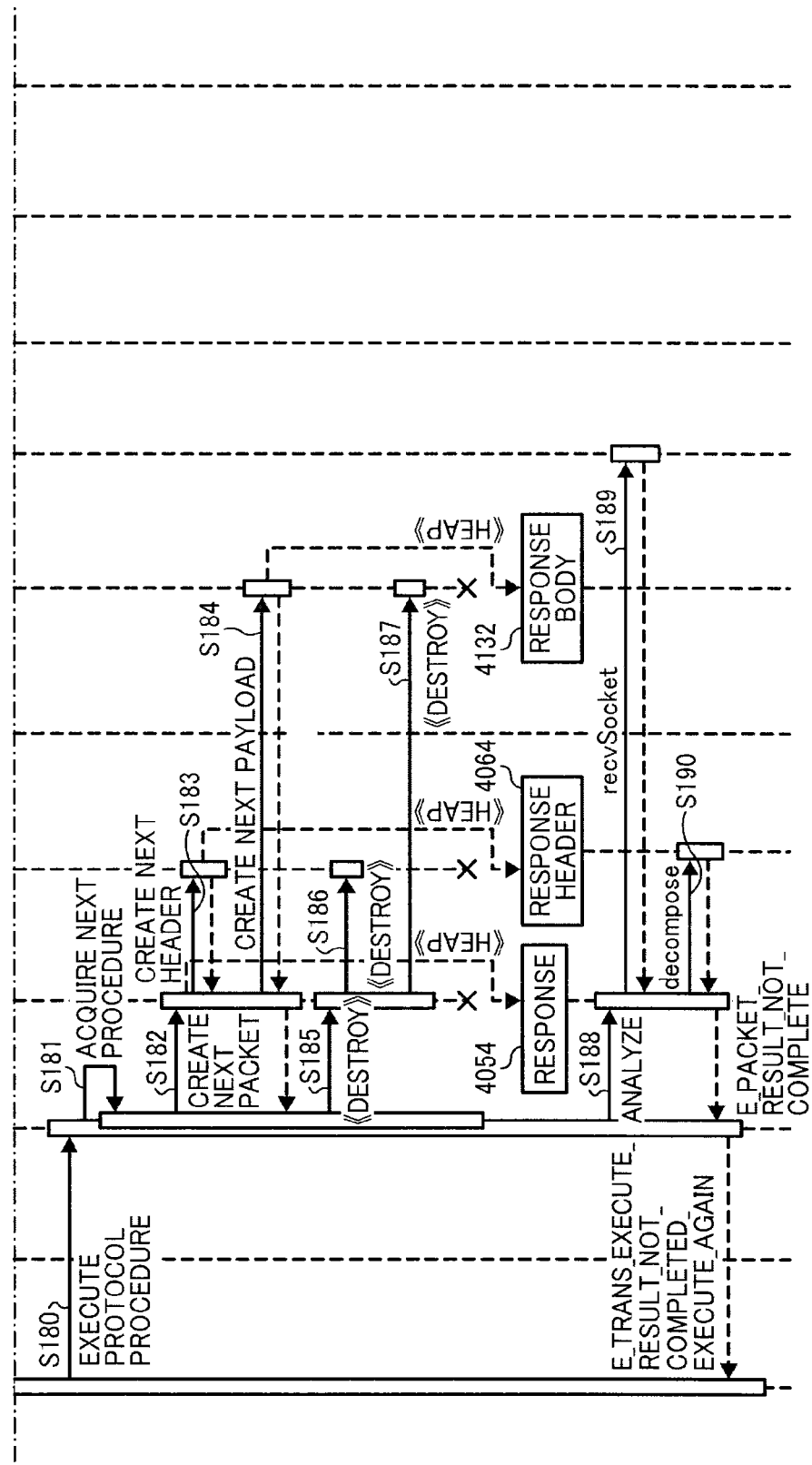

Next, in FIGS. 17A and 17B, after receiving notice of executing protocol procedure from the application layer protocol processing task 402 (S171), the HTTP client procedure (protocol default) storing unit 408 acquires the next procedure (S172). Subsequently, the HTTP client procedure (protocol default) storing unit 408 creates request 4053 in the application layer packet processing unit 405 (S173).

The application layer packet processing unit 405 creates the request body 4131 in the application layer payload management unit 413 (S174) and sends the request body to the other device via the socket I/F bridge 409 (S175).

Next, the application layer packet processing unit 405 releases buffer in the bridge with application layer 414 (S176). In this process, user buffer for a command that requests to send via network is released. It should be noted that the application layer packet processing unit 405 deletes "U App Layer Param Value" structure whose value is "S User Data" structure from list.

Furthermore, the application layer packet processing unit 405 acquires buffer in the bridge with application layer 414 (S177). In case of acquiring buffer for content from user, exclusive access control is engaged by executing "SEM_TRANS_CONTNT" process. It is necessary to wait for the release of exclusive access control in case the access is already exclusively controlled. It should be noted that a plurality of content data can be prevented from getting mixed in at the time of OMAP transfer and becoming hard to differentiate on the OMAP side by engaging exclusive access control.

The application layer packet processing unit 405 sends command for response to request to send via network in communication between sub-systems via the bridge with application layer 414. However, regarding response to the last request to send via network, no command for response is sent if "S Auth Info" is included in "App Param List". The application layer packet processing unit 405 releases exclusive access control of buffer for content.

After waiting for user, the application layer protocol processing task 402 adds a parameter in the application layer in/out parameter data list 403 (S179). The application layer protocol processing task 402 adds "U App Layer Param Value" structure whose value is "S User Data" structure to list. It should be noted that processes from S171 to S179 are repeated until finishing creating payload (LOOP42).

Next, after receiving notice of executing protocol procedure from the application layer protocol processing task 402 (S180), the HTTP client procedure (protocol default) storing unit 408 acquires the next procedure (S181). Subsequently, the HTTP client procedure (protocol default) storing unit 408 creates the next packet in the application layer packet processing unit 405 (S182) and allocates memory area for creating response 4054 (heap).

Also, the application layer packet processing unit 405 creates the next header in the HTTP header management unit 406 (S183) and allocates memory area for creating response header 4064 (heap).

Furthermore, the application layer packet processing unit 405 creates next payload in the application layer payload management unit 413 (S184) and allocates memory area for creating response body 4132 (heap).

The HTTP client procedure (protocol default) storing unit 408 finishes processes in the application layer packet processing unit 405 (destroy in S185). The application layer packet processing unit 405 finishes processes in the HTTP header management unit 406 (destroy in S186) and in the application layer payload management unit 413 (destroy in S187).

Next, the HTTP client procedure (protocol default) storing unit 408 executes analyzing process in the application layer packet processing unit 405 (S188). The application layer packet processing unit 405 executes "recv Socket" process in the socket I/F bridge 409 (S189).

Furthermore, the application layer packet processing unit 405 executes "decompose" process in the socket I/F bridge 409 (S190). In this case, if status code is 417 (Proxy-Authenticate), "S Auth Info->fis_failed" in "App Param List" is set to "TRANS_TRUE".

If status code is not 417, "SAuthInfo->fis_failed" in "App Param List" is set to "TRANS_FALSE".

Also, the HTTP header management unit 406 returns whether or not size of payload is known to the application layer packet processing unit 405 using "packet_attr" which is out parameter of "decompose". If size of payload is known, "packet_attr.f_has_payload_size" is set to "TRANS_TRUE". If size of payload is not known, "packet_attr.f_has_payload_size" is set to "TRANS_FALSE".

If "Auth Info" is included in "App Param List", the HTTP client procedure (protocol default) storing unit 408 returns a response to a request to send via network (failed to authenticate proxy: 0x06) in case value of "SAuthInfo->fis_failed" is "TRANS_TRUE" and returns a response to a request to send via network (suceede: 0x01) in case value of "SAuthInfo->fis_failed" is "TRANS_FALSE".

Figure 18A:
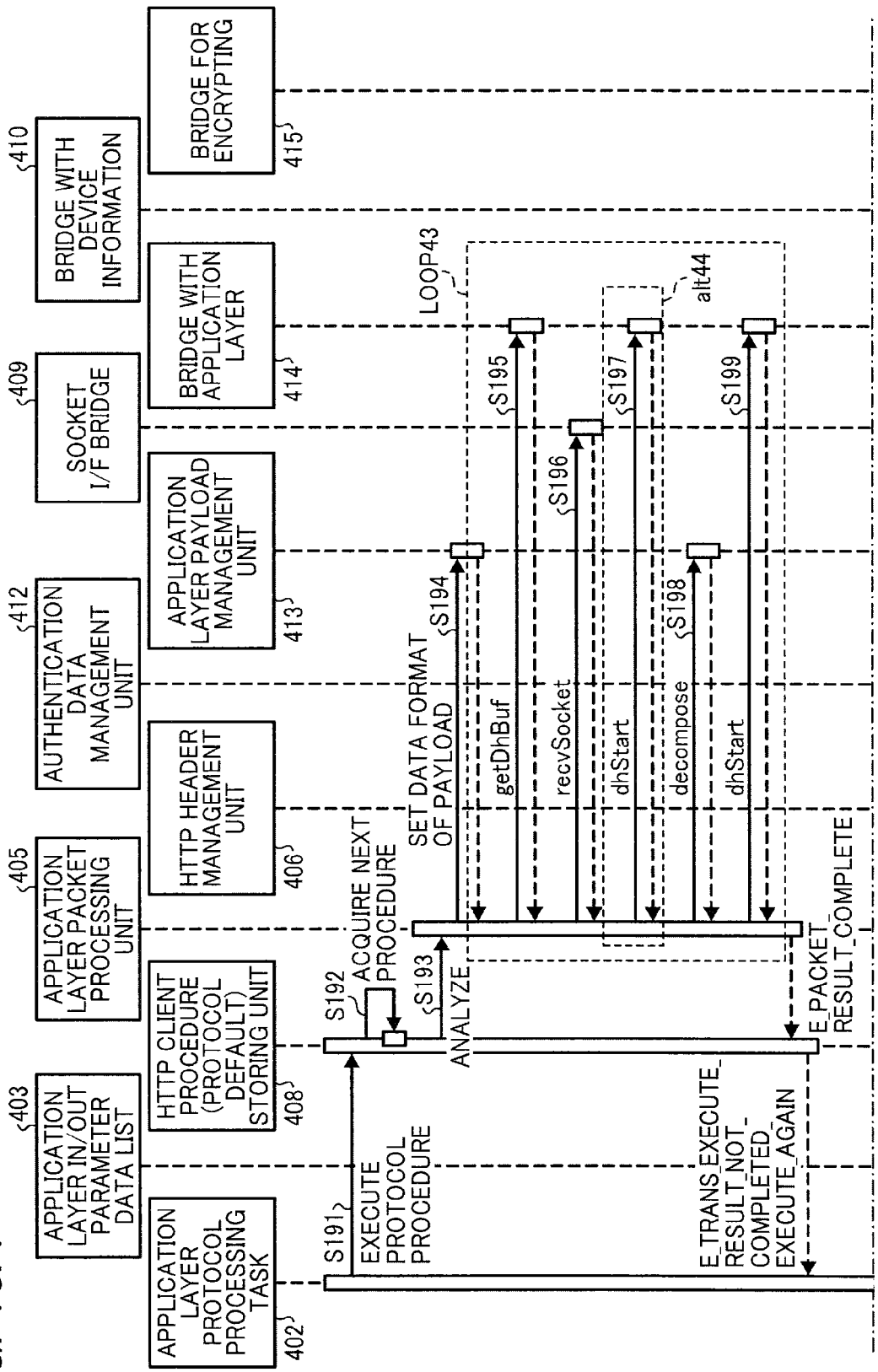
FIGS. 18A and 18B are sequence diagrams illustrating an operation of the apparatus that includes the network controller of the second embodiment and works as a HTTP client in the present invention.
Figure 18B:
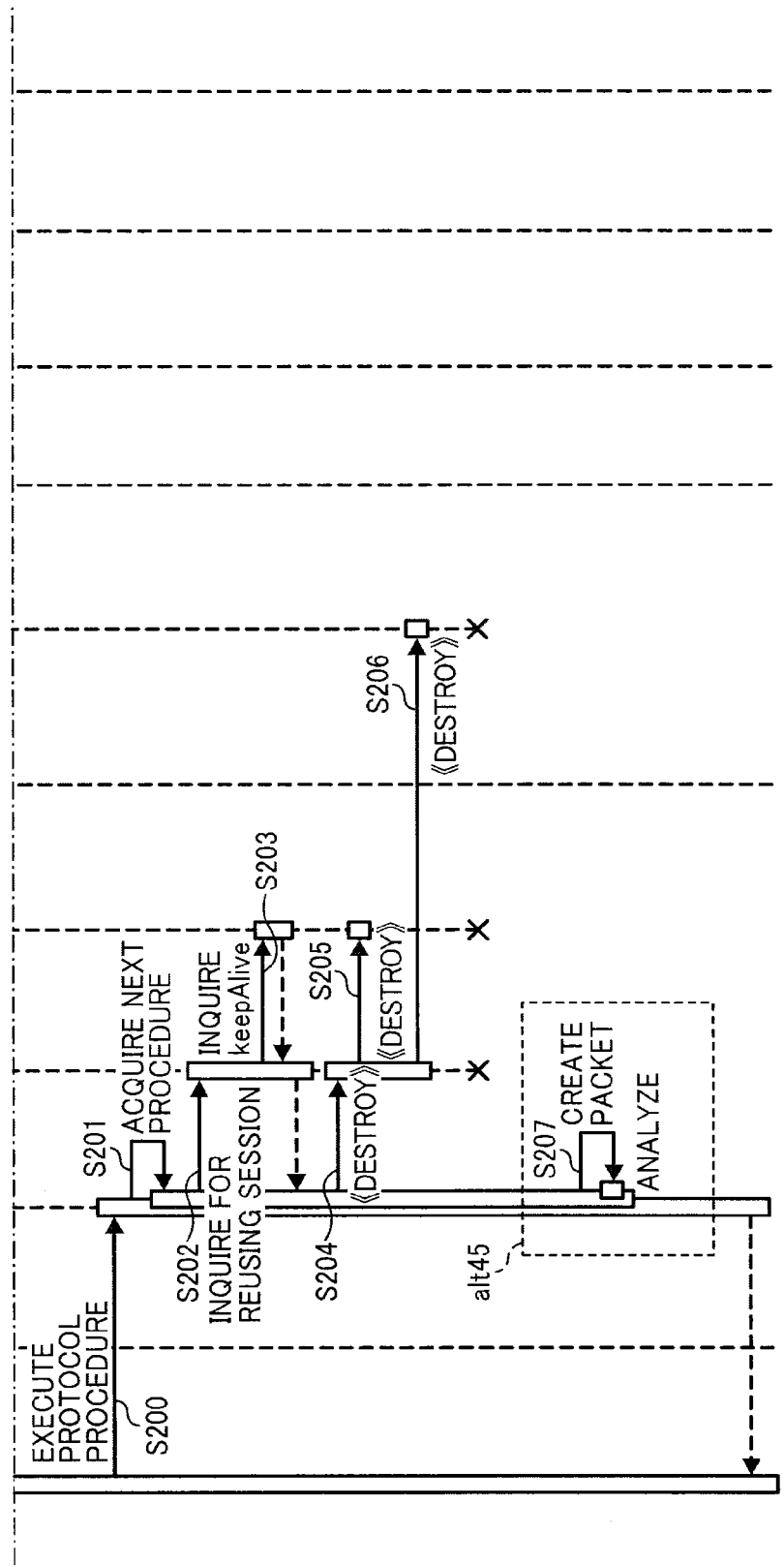

Next, as shown in FIGS. 18A and 18B, after receiving notice of executing protocol procedure from the application layer protocol processing task 402 (S191), the HTTP client procedure (protocol default) storing unit 408 acquires the next procedure (S192). Subsequently, the HTTP client procedure (protocol default) storing unit 408 executes analyzing process in the application layer packet processing unit 405 (S193).

The application layer packet processing unit 405 executes setting process of payload data format in the application layer payload management unit 413 (S194). In this case, if payload size is known, "has_payload_size" is set to "TRANS_TRUE" and "payload_size" is set to value of payload size. If payload size is not known, "has_payload_size" is set to "TRANS _FALSE" and "payload_size" is set to 0.

Next, the application layer packet processing unit 405 executes "get Dh Buf" process in the bridge with application layer 414 (S195). In this case, if buffer for content is acquired from user, exclusive access control is engaged by "SET_TRANS_CNTNT" process until analysis of payload is over. It should be noted that processes from S195 to S199 (described later) are repeated until analysis of payload is over (LOOP43).

Next, the application layer packet processing unit 405 executes "recv Socket" process in the socket I/F bridge 409 (S196).

If an error occurs in "recv Socket" process, the process branches to alt44. In this case, the application layer packet processing unit 405 executes "dh Start" process in the bridge with application layer 414 (S197). That is, after transferring unfinished transfer data to OMAP, the process goes out of loop (LOOP43). It should be noted that the process goes through this path in case of receiving HTTP response without "Content-Length" and closing connection from server.

Next, the application layer packet processing unit 405 executes "decompose" process in the application layer payload management unit 413 (S198). In this case, if payload size is known, "E_PAYLOAD_RESULT_COMPLETE" is returned at the time of receiving all the payload and "E_PAYLOAD_RESULTNOT_COMPLETE" is returned before finishing receiving all the payload. If payload size is not known, "E_PAYLOAD_RESULT_NOT_COMPLETE" is always returned.

Next, the application layer packet processing unit 405 executes "dh Start" process in the bridge with application layer 414 (S199). In this case, the application layer packet processing unit 405 transfers firstly only header to OMAP. Transfer to OMAP is executed only if user buffer becomes full and analysis of payload is over in case of not chunk and user buffer becomes full and analysis of payload for one chunk is over in case of chunk.

Next, the application layer packet processing unit 405 releases exclusive access control of buffer for content from user. It should be noted that the application layer packet processing unit 405 returns error reason using "error_reason" which is out parameter to the HTTP client procedure (protocol default) storing unit 408 in case a socket error occurs.

Also, if a socket error occurs, the HTTP client procedure (protocol default) storing unit 408 returns "E_TRANS_EXECUTE_RESULT_NOT_COMPLETED_EXECUTE_AGAIN" to the application layer protocol processing task 402.

The application layer protocol processing task 402 finishes response to request to share received data via network. It should be noted that the application layer protocol processing task 402 discards response to request to share received data via network by executing "App Protocol Task" process in case of finishing procedure with occurring a socket error.

Next, after receiving notice of executing protocol procedure from the application layer protocol processing task 402 (S200), the HTTP client procedure (protocol default) storing unit 408 acquires the next procedure (S201). Subsequently, the HTTP client procedure (protocol default) storing unit 408 inquires of the application layer packet processing unit 405 whether or not session is reused (S202).

The application layer packet processing unit 405 inquires "keep Alive" in the HTTP header management unit 406 (S203). Subsequently, the HTTP client procedure (protocol default) storing unit 408 finishes processes in the application layer packet processing unit 405 (destroy in S204), and the application layer packet processing unit 405 finishes processes in the HTTP header management unit 406 (destroy in S205)and the application layer payload management unit 413 (destroy in S206).

If there is "keep Alive", the process branches to alt45. In this case, the HTTP client procedure (protocol default) storing unit 408 creates packets (S207). That is, the HTTP client procedure (protocol default) storing unit 408 creates instances of packets that include header and payload. If "fis_secured" is set to "TRANS_TRUE", "App Layer Packet/set Low Layer Secured" is called so that secure communication can be continued.

Figure 19A:
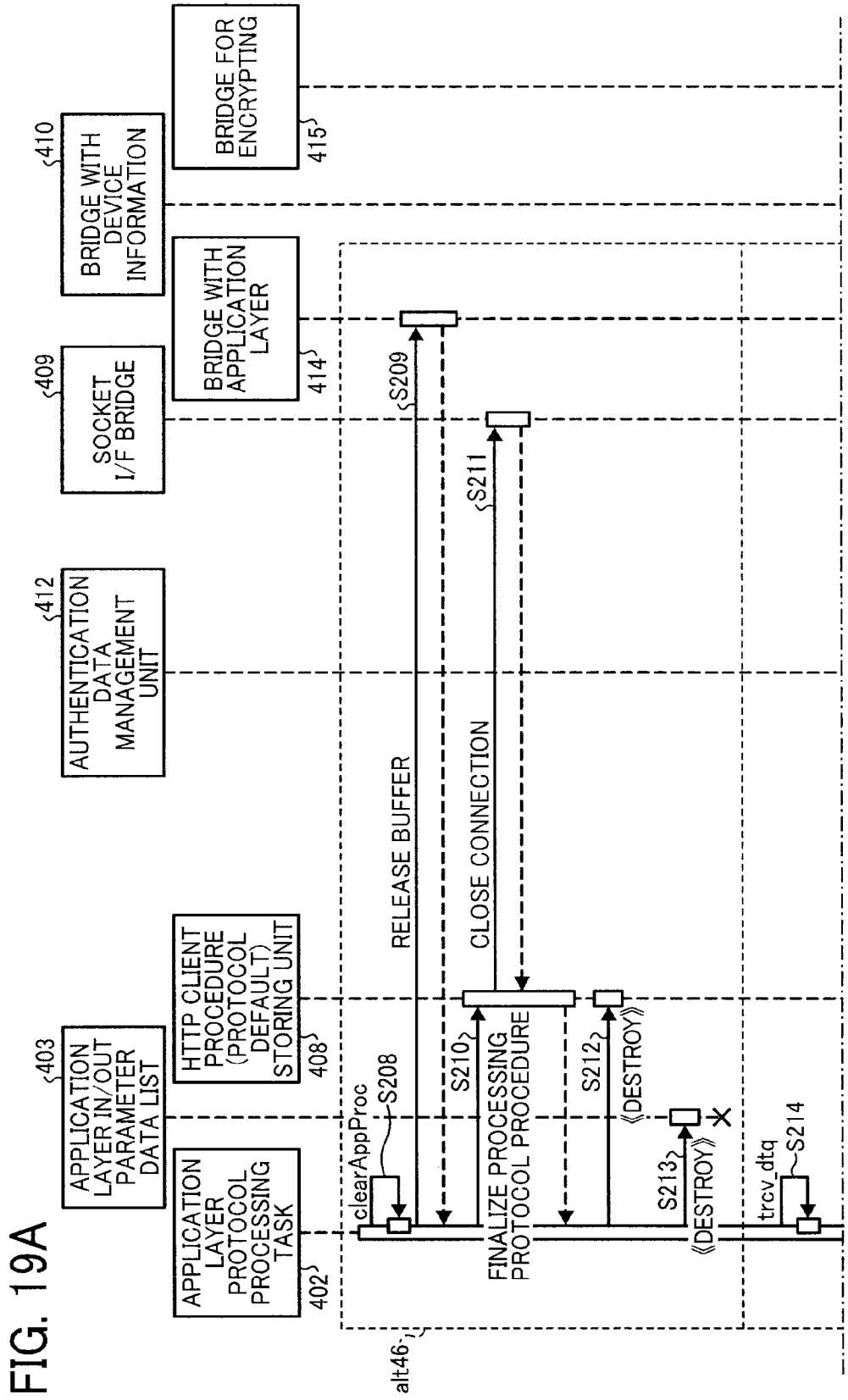
FIGS. 19A and 19B are sequence diagrams illustrating an operation of the apparatus that includes the network controller of the second embodiment and works as a HTTP client in the present invention.
Figure 19B:
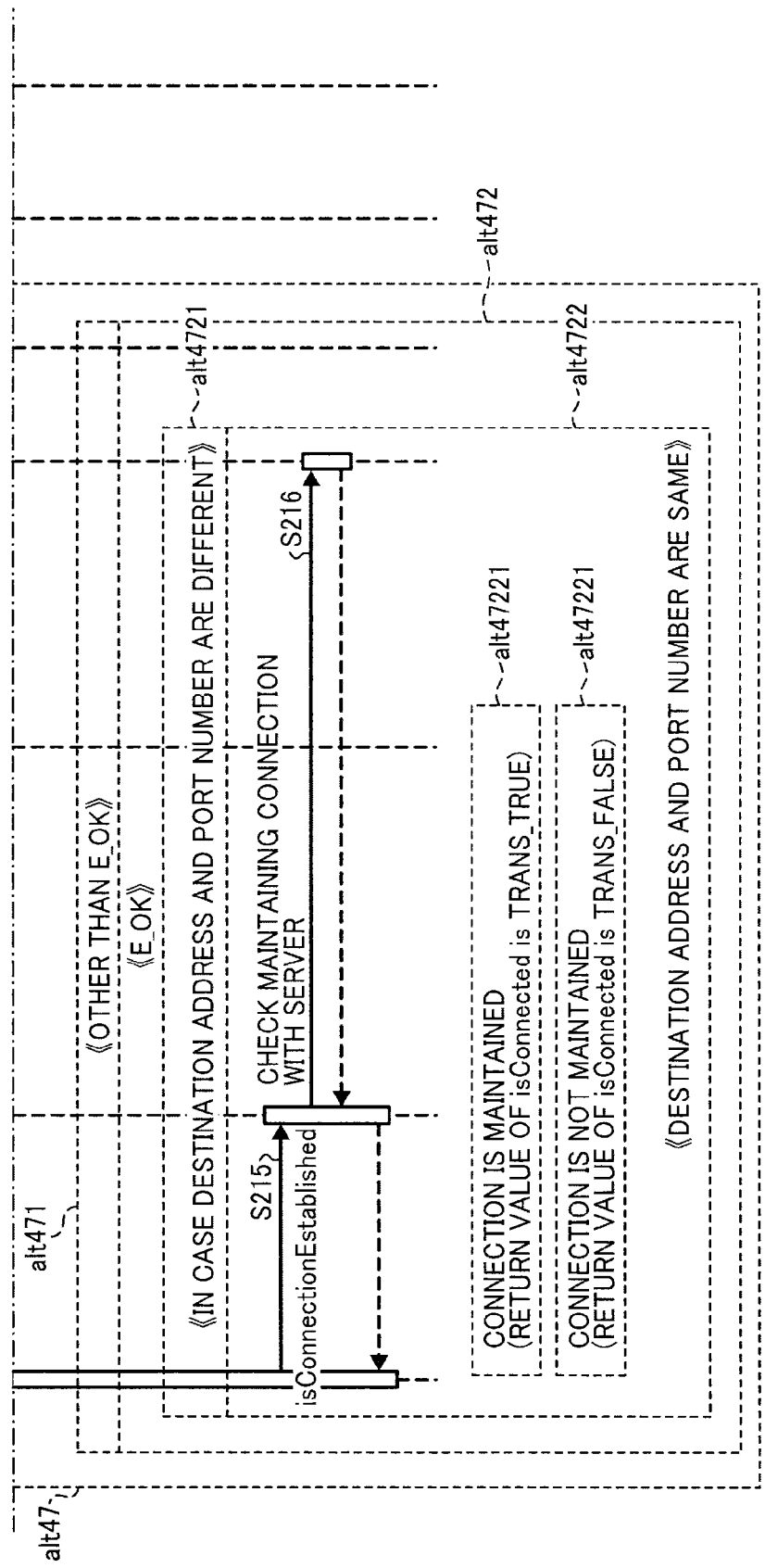

Next, as shown in FIGS. 19A and 19B, each of process that branches in case of not reusing session (alt46) and process that branches in case of reusing session (alt47) is described below.

In case of not reusing session (alt46), after processing "clear App Proc" (S208), the application layer protocol processing task 402 releases buffer for request to receive data via network in the bridge with application layer 414 (S209).

Next, the application layer protocol processing task 402 finishes protocol procedure in the HTTP client procedure (protocol default) storing unit 408 (S210), and the HTTP client procedure (protocol default) storing unit 408 closes connection in the socket I/F bridge 409 (S211).

Next, the application layer protocol processing task 402 finishes processes in the HTTP client procedure (protocol default) storing unit 408 (destroy in S212) and the application layer in/out parameter data list 403 (destroy in S213). In this case, "S App Layer Param" structure whose value is "S Host Info" structure and "S App Layer Param" structure whose value is "S Auth Info" structure remaining on list are deleted. Subsequently, the process returns to S102 (rcv_dtp).

Alternatively, in case of reusing session (alt47), after processing "trcv_dtq" (S214), the process further branches (alt471 or alt472). In case of not E_OK (alt471), after processing "clearAppProc", the process returns to S102 (rcv_dtp).

In case of E_OK (alt472), the process further branches (alt4721 or alt4722). In case destination address and port number are different (alt4721), after processing "clear App Proc", the process returns to S102 (rcv_dtp).

In case destination address and port number are same (alt4722), the application layer protocol processing task 402 executes "is Connection Established" process in the HTTP client procedure (protocol default) storing unit 408 (S215). Subsequently, the HTTP client procedure (protocol default) storing unit 408 inquires of the socket I/F bridge 409 whether or not connection with server is maintained (S216).

Next, the process further branches (alt47221 or alt47222). In case connection is maintained (return value of is Connected is "TRANS_TRUE") (alt47221), the process returns to S103 (start App Proc). In this case, the process skips to "execute" process since running procedure already exists.

Alternatively, in case connection is not maintained (return value of is Connected is "TRANS _FALSE") (alt47222), after processing "clearApp Proc", the process returns to S102 (rcv_dtp).

Third Embodiment

Sequence of processes in case an apparatus that includes a network controller of a third embodiment of the present invention operates as a HTTP client is described below with reference to sequence diagrams from FIG. 20 to FIGS. 23A and 23B. Processing units that execute each process are shown in the upper part of the sequence diagrams. It should be noted that description regarding process that creates HTTP request packet from data received from application is omitted since it is the same as the second embodiment, and description below is focused on encrypted communication process.

The difference between the third embodiment and the second embodiment of the present invention is that SSL/TLS session starting process and session finishing process are executed in order to execute encrypted communication in the third embodiment. That is, data is sent with encrypting and received with decoding using SSL/TLS in sending/receiving data in the third embodiment. It should be noted that all procedures of encrypted communication are hidden using attributes of the request to send via network ("certification CN name", "set of authenticate certification", "operation in case server authentication failed", and "check of certification CN go/no-go").

Figure 20:
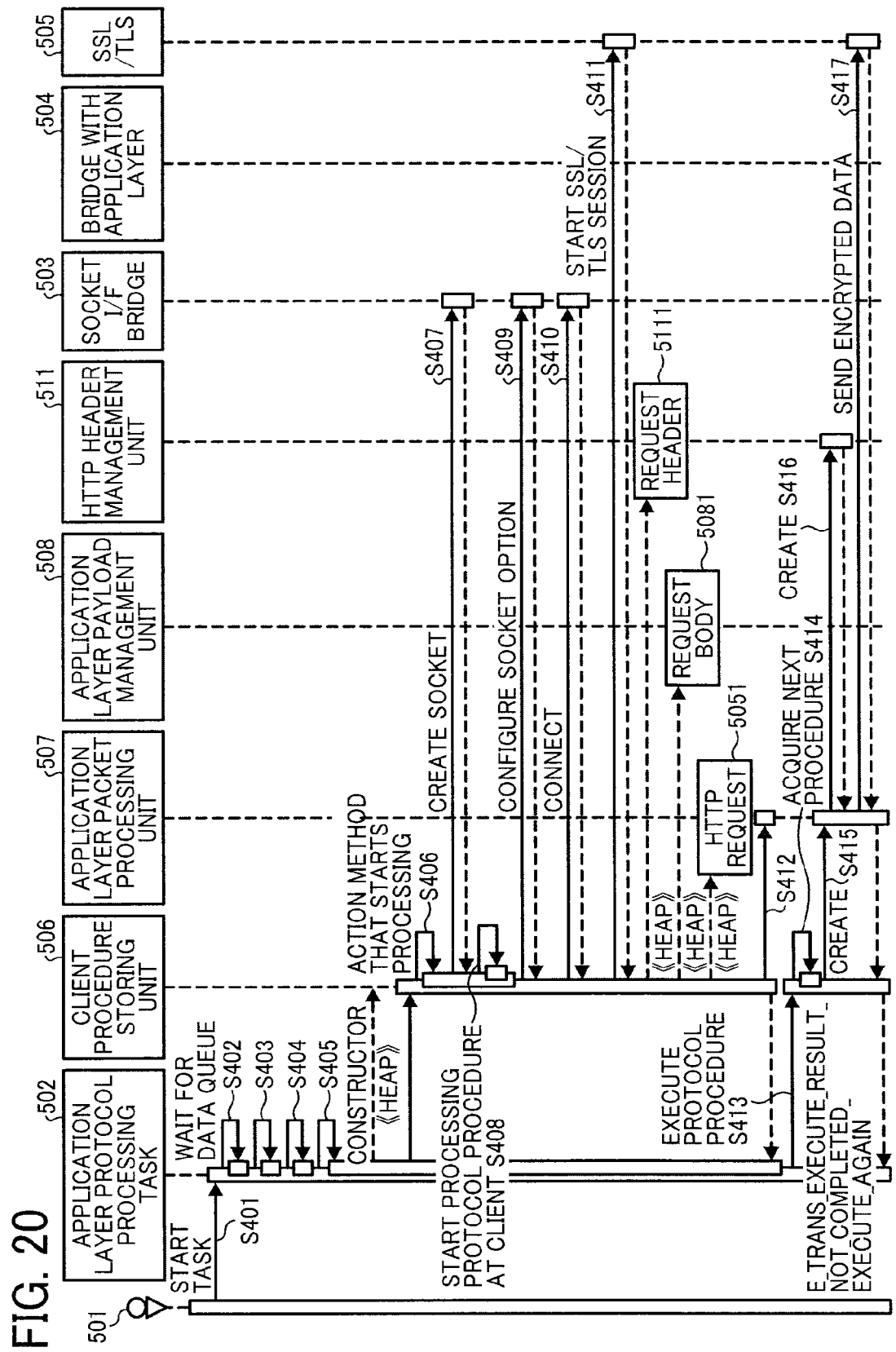
FIG. 20 is a sequence diagram illustrating an operation of an apparatus that includes the network controller of a third embodiment and executes encrypted communication as a HTTP client in the present invention.

Left to right in FIG. 20, there are a person (TRANS_RXTX1_TASK) 501, an application layer protocol processing task 502, a client procedure storing unit 506, an application layer packet processing unit 507, a application layer payload management unit 508, the HTTP header management unit 511, the socket I/F bridge 503, the bridge with application layer 504, and a SSL/TLS 505.

After receiving notice of starting task from the person 501, the application layer protocol processing task 502 starts (S401). The application layer protocol processing task 502 waits for data queue (S402). Waiting for queue is set to data queue by interrupt from user. In this case, request data of sending via network described above with reference to FIGS. 4A and 4B is received in communication between sub-systems.

It should be noted that, in case of device header, OMAP energy saving 0 is set to divided data size and EOF is "0x00". Alternatively, in case of application header, OMAP communication sets communication data size to application data size. In this case, destination is "0x0003 (RXTX3)", control message is "0x02", detail of message ID is "0x0D", communication mode is "0x00", and vibration is "0x00".

Next, "start App Proc" function is executed (S405) after "handle Data Queue Event" process (S403) and "handle User Event" process (S404). "open_error_reason" is defined by "start App Proc" function and passed as out parameter to called functions.

The application layer protocol processing task 502 allocates memory area to process client procedure by constructor in the client procedure storing unit 506 (heap). In this case, a flag to determine whether or not SSL communication is executed is set to the third argument. Subsequently, the application layer protocol processing task 502 executes starting procedure by "open".

The client procedure storing unit 506 executes starting procedure by action method (S406). Subsequently, the client procedure storing unit 506 creates socket in the socket I/F bridge 503 and calls external "SOCK_Socket" (S407). The client procedure storing unit 506 executes protocol procedure starting process of client (S408).

Next, the client procedure storing unit 506 sets socket option in the socket I/F bridge 503 and calls external "SOCK_Set Sock Option" (S409). Subsequently, the client procedure storing unit 506 connects with an external device via the socket I/F bridge 503 (S410). In this case, external "SOCK Connect" is called.

The client procedure storing unit 506 executes SSL/TLS session starting process in the SSL/TLS 505 (S411). In this case, with reference to parameters of request data for sending via network of communications between sub-systems, "TLS_Open Socket" is called if protocol type is HTTPS (0x02). Also, at this timing, it is stored that attribute is SSL/TLS with "fis_secured".

The client procedure storing unit 506 allocates memory area to create HTTP request 5051 in the application layer packet processing unit 507, to create request body 5081 in the application layer payload management unit 508, and to create request header 5111 in the HTTP header management unit 511 (heap). Also, the client procedure storing unit 506 sets that secure communication is taking place in the application layer packet processing unit 507 (S412).

It should be noted that the client procedure storing unit 506 returns error response of "send Error Response" to the application layer protocol processing task 502 in case of occurring error. Regarding corresponding to result of sending returned to OMAP, "0x01" means "succeeded", "0x02" means "failed to connect with host", "0x03" means "failed to connect with SSL", "0x04" means "failed to authenticate at server", "0x05" means "failed to authenticate at client", "0x06" means "failed to authenticate at proxy", and "0x07" means "failed in data communication".

Next, after receiving notice of executing protocol procedure from the application layer protocol processing task 502 (S413), the client procedure storing unit 506 acquires the next procedure (S414). Subsequently, the client procedure storing unit 506 creates the HTTP request 5051 in the application layer packet processing unit 507 (S415).

Also, the application layer packet processing unit 507 creates the request header 5111 in the HTTP header management unit 511 (S416) and starts encryption sending process via the SSL/TLS 505 (S417). In this case, "TLS_WriteSocket" is called in case of "fislow_layer_secured (TRANS_TRUE)", and "SOCK_Write" is called in case of fislow_layer_secured (TRANS_FALSE).

Figure 21A:
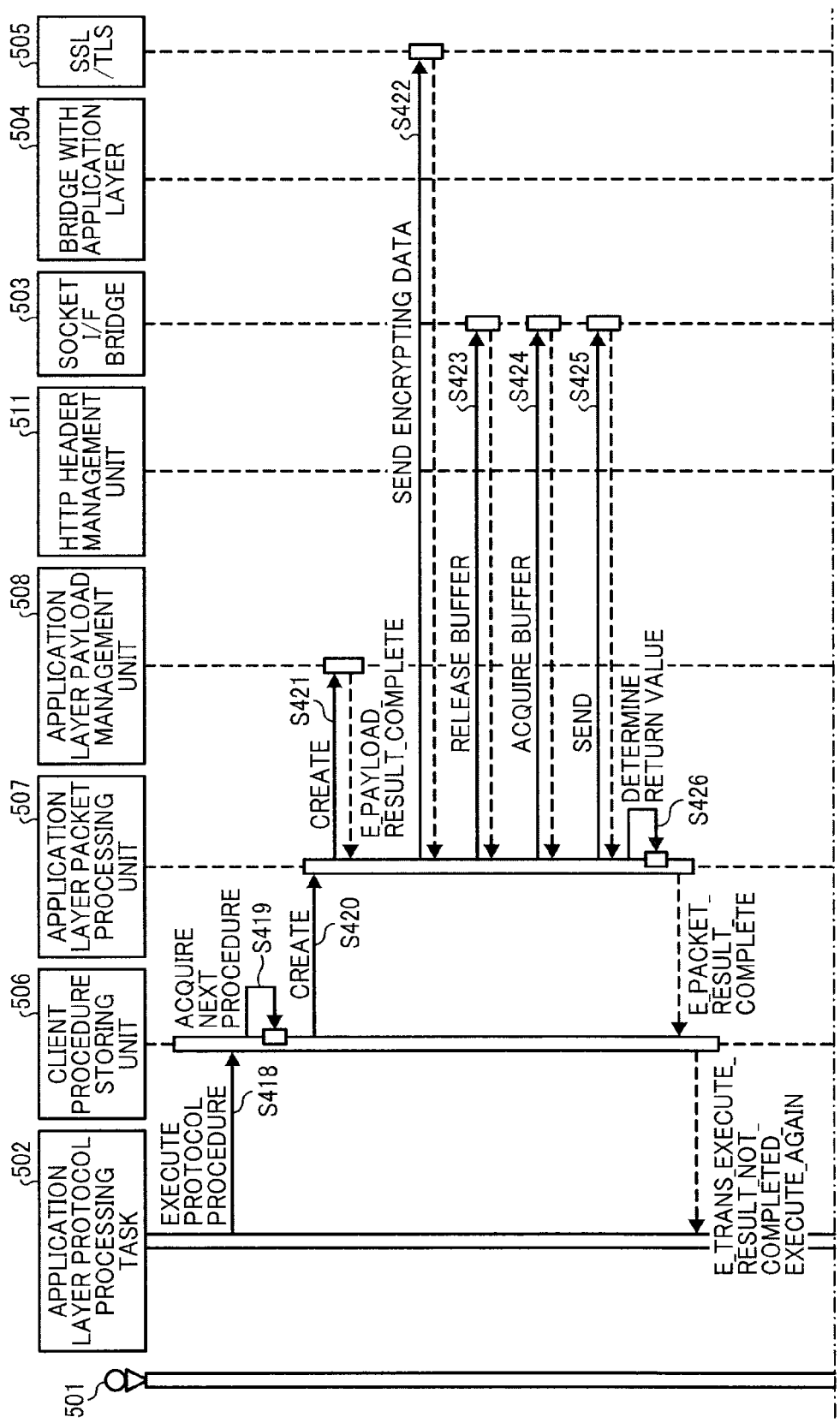
FIGS. 21A and 21B are sequence diagrams illustrating an operation of the apparatus that includes the network controller of the third embodiment and executes encrypted communication as a HTTP client in the present invention.
Figure 21B:
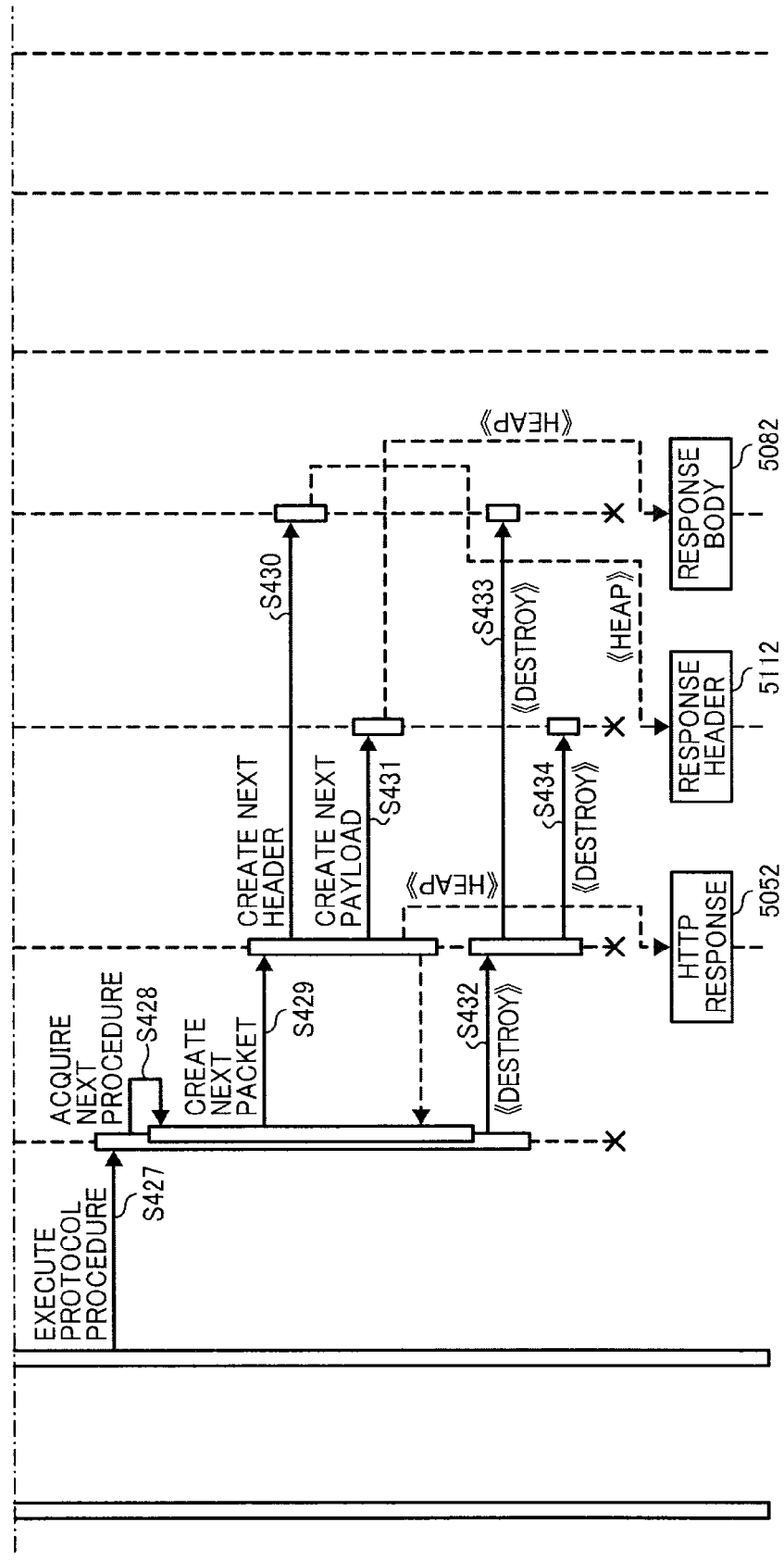

Next, as shown in FIGS. 21A and 21B, after receiving notice of executing protocol procedure from the application layer protocol processing task 502 (S418), the client procedure storing unit 506 acquires the next procedure (S419). Subsequently, the client procedure storing unit 506 creates the HTTP request 5051 in the application layer packet processing unit 507 (S420).

The application layer packet processing unit 507 creates the request body 5081 in the application layer payload management unit 508 (S421). Also, the application layer packet processing unit 507 executes encryption sending process in the SSL/TLS 505 (S422).

Furthermore, the application layer packet processing unit 507 executes buffer releasing process (S423), buffer acquisition process (S424), and sending process (S425) in the socket I/F bridge 503. In this case, the application layer packet processing unit 507 sends response data to request for sending via network. In this case, sending source is "TRANS _RXTX3 (0x0003)", and result of sending is "succeeded (0x01)".

Also in this case, regarding device header, divided data size is 4 bytes, and EOF is "0x00". Alternatively, regarding application header, application data size is 4 bytes, destination is "0x0001", control message ID is "0x03", Detail about message ID is "0x0D", Communication mode is "0x00", and vibration is "0x00".

Next, the application layer packet processing unit 507 determines return value (S426). In this case, if data sent from OMAP is divided data, return value of "App Layer Payload" is "E_PAYLOAD_RESULT_NOT_COMPLETED" and return value of "App Layer Packet" is "E_PACKET_RESULT_NOT_COMPLETE_WAIT_INPUT".

Next, after receiving notice of executing protocol procedure from the application layer protocol processing task 502 (S427), the client procedure storing unit 506 acquires the next procedure (S428). Subsequently, the client procedure storing unit 506 creates response packet in the application layer packet processing unit 507, the application layer payload management unit 508, and the HTTP header management unit 511. Detail of this process is the same as the second embodiment as described above, so detailed explanation is omitted (steps from S429 to S442).

Next, as shown in FIG. 22, the client procedure storing unit 506 analyzes HTTP response 5053 created in S437 in the application layer packet processing unit 507 (S443). The application layer packet processing unit 507 receives data encoded via the SSL/TLS 505 (S444). The application layer packet processing unit 507 analyzes response header 5113 in the HTTP header management unit 511 (S445).

Figure 23B:
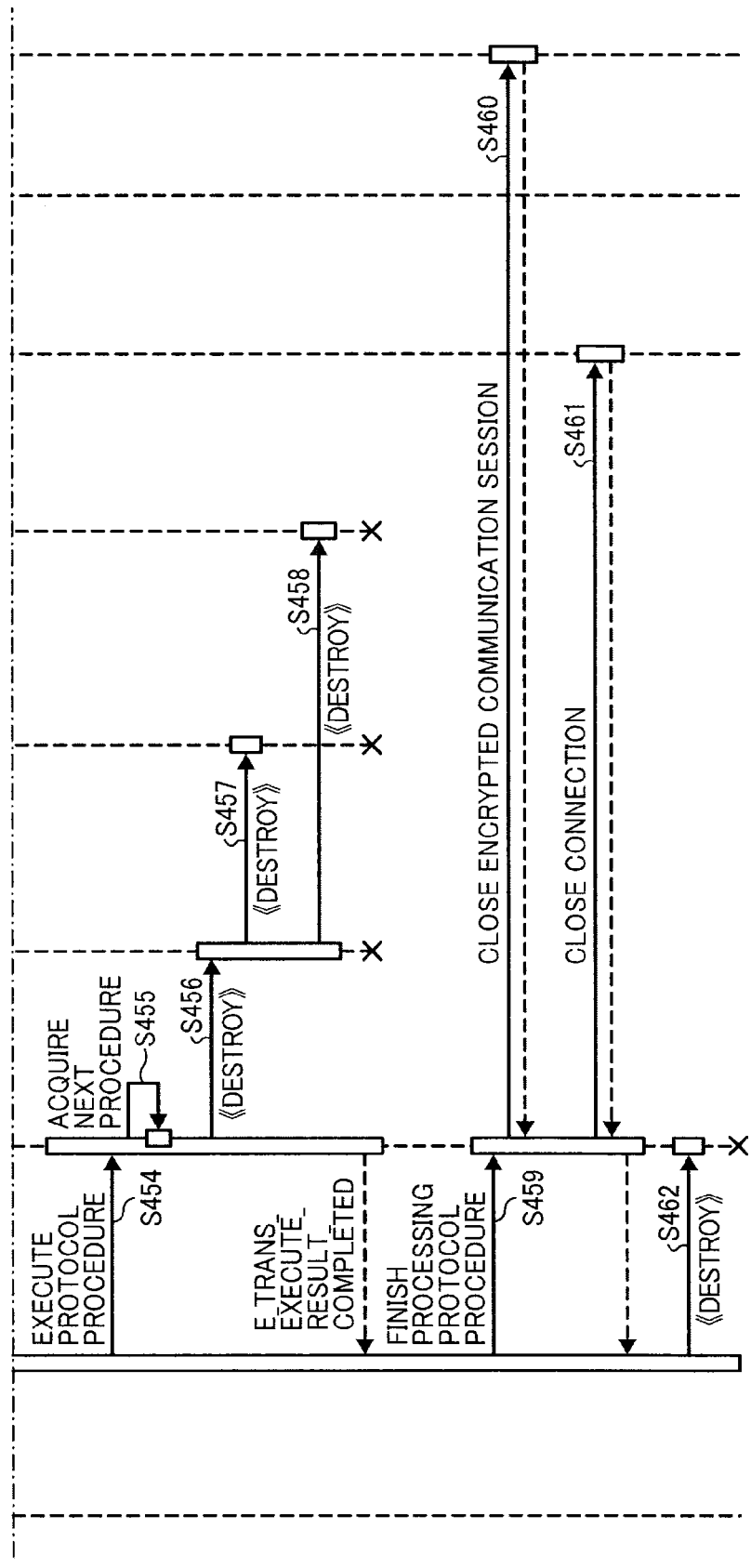

Next, as shown in FIGS. 23A and 23B, after receiving notice of executing protocol procedure from the application layer protocol processing task 502 (S446), the client procedure storing unit 506 acquires the next procedure (S447). Subsequently, the client procedure storing unit 506 starts analysis process in the application layer packet processing unit 507 (S448).

The application layer packet processing unit 507 acquires buffer via the bridge with application layer 504 (S449). In this case, only HTTP header is sent to OMAP firstly. Subsequently, the application layer packet processing unit 507 executes sending process via the bridge with application layer 504 (S450) and receives encoded data via the SSL/TLS 505 (S451).

The application layer packet processing unit 507 executes analysis process in the application layer payload management unit 508 (S452), and executes sending process via the bridge with application layer 504 (S453).

Next, after receiving notice of executing protocol procedure from the application layer protocol processing task 502 (S454), the client procedure storing unit 506 acquires the next procedure (S455). Subsequently, the client procedure storing unit 506 finishes processes in the application layer packet processing unit 507 (destroy in S456), the application layer packet processing unit 507 finishes processes in the HTTP header management unit 511 (destroy in S457), and processes in the application layer payload management unit 508 are finished (destroy in S458).

Lastly, after receiving notice of finishing protocol procedure from the application layer protocol processing task 502 (S459), the client procedure storing unit 506 closes encrypted communications session (S460). Subsequently, the client procedure storing unit 506 disconnects from the socket I/F bridge 503 (S461). The application layer protocol processing task 502 finishes processes in the client procedure storing unit 506 (S462).

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. A network controller, comprising:
a network interface to communicate with a plurality of terminals via a network;
an upper application interface to communicate with upper applications that utilize a plurality of communications protocols;
a protocol procedure controller to control a plurality of protocol procedures to communicate with the plurality of terminals via a network using the plurality of communications protocols;
a protocol analyzing unit to analyze the plurality of communications protocols, further comprising a protocol header analyzing unit to analyze a plurality of protocol headers of the plurality of communications protocols individually; and
an association table to execute protocol communications processing by combining the plurality of protocol procedures from requests received from the plurality of terminals by the upper application interface, wherein the protocol header analyzing unit can specify whether or not a session by the protocol procedure controller is reused,
the protocol header analyzing unit passes information on the plurality of communications protocol headers to upper applications, and
the protocol analyzing unit further comprises a payload analyzing unit to analyze a data format of a payload of the communications protocol individually.

2. The network controller according to claim 1, wherein the upper application interface can specify whether or not encryption communication is carried out.

3. The network controller according to claim 1, wherein the upper application interface can specify whether or not communication goes through a repeater.

4. The network controller according to claim 1, wherein the upper application interface can specify a communications party by domain name.

5. The network controller according to claim 1, further comprising a device information management unit to change and acquire settings of device information using an installed communications protocol.

6. A method of controlling a network, comprising:
communicating with a plurality of terminals via a network;
communicating with upper applications that utilize a plurality of communications protocols;
controlling a plurality of protocol procedures to communicate with the plurality of terminals via a network using the plurality of communications protocols; and
analyzing the plurality of communications protocols and analyzing a plurality of protocol headers of the plurality of communications protocols individually; and
storing an association table to execute protocol communications processing by combining the plurality of protocol procedures from requests received from the plurality of terminals by the upper applications, wherein
the analyzing includes specifying whether or not a session of a protocol procedure is reused,
the analyzing includes passing information on the plurality of communications protocol headers to upper applications, and
the analyzing further comprises analyzing a data format of a payload of the communications protocol individually.

7. A non-transitory computer-readable medium storing a program that, when executed by a computer, causes the computer to implement a method of controlling a network, the method comprising:
communicating with a plurality of terminals via a network;
communicating with upper applications that utilize a plurality of communications protocols;
controlling a plurality of protocol procedures to communicate with the plurality of terminals via a network using the plurality of communications protocols; and
analyzing the plurality of communications protocols and analyzing a plurality of protocol headers of the plurality of communications protocols individually; and
storing an association table to execute protocol communications processing by combining the plurality of protocol procedures from requests received from the plurality of terminals by the upper applications, wherein
the analyzing includes specifying whether or not a session of a protocol procedure is reused
the analyzing includes passing information on the plurality of communications protocol headers to upper applications, and
the analyzing further comprises analyzing a data format of a payload of the communications protocol individually.

* * * * *